US008103573B2

(12) United States Patent
Tatro et al.

(10) Patent No.: US 8,103,573 B2
(45) Date of Patent: *Jan. 24, 2012

(54) METHOD AND SYSTEM FOR PROCESSING DATA FOR A DEFERRED ANNUITY WITH AVAILABLE BENEFIT PAYMENTS RELATED TO AN INCREASING WITHDRAWAL PERCENT

(75) Inventors: Charles D. Tatro, Mendon, MA (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,001

(22) Filed: Jul. 14, 2011

(65) Prior Publication Data

US 2011/0270637 A1 Nov. 3, 2011

Related U.S. Application Data

(63) Continuation of application No. 11/983,473, filed on Nov. 9, 2007, now Pat. No. 8,015,092.

(60) Provisional application No. 60/961,735, filed on Jul. 24, 2007.

(51) Int. Cl.
*G06Q 40/00* (2006.01)
(52) U.S. Cl. .................. 705/36 R; 705/35; 705/37
(58) Field of Classification Search .............. 705/35, 705/36 R, 37
See application file for complete search history.

(56) References Cited

U.S. PATENT DOCUMENTS

| 5,754,980 | A | 5/1998 | Anderson et al. |
| 5,878,405 | A | 3/1999 | Grant et al. |
| 5,893,071 | A | 4/1999 | Cooperstein |
| 5,913,198 | A | 6/1999 | Banks |
| 5,926,800 | A | 7/1999 | Baronowski et al. |
| 5,933,815 | A | 8/1999 | Golden |
| 6,049,772 | A | 4/2000 | Payne et al. |
| 6,064,986 | A | 5/2000 | Edelman |
| 6,275,807 | B1 | 8/2001 | Schirripa |
| 6,611,808 | B1 * | 8/2003 | Preti et al. ............... 705/4 |
| 6,611,815 | B1 | 8/2003 | Lewis et al. |
| 6,636,834 | B1 | 10/2003 | Schirripa |
| 6,950,805 | B2 | 9/2005 | Kavanaugh |
| 6,963,852 | B2 | 11/2005 | Koresko, V |
| 7,016,871 | B1 | 3/2006 | Fisher et al. |
| 7,089,201 | B1 | 8/2006 | Dellinger et al. |

(Continued)

OTHER PUBLICATIONS

The Right Rider: Boomers want guaranteed lifetime income, but don't want to buy an immediate annuity. Variable annuity issuers think they have a solution. Donald Jay Korn. Financial Planning. New York: Feb. 1, 2006. p. 104-106.

(Continued)

*Primary Examiner* — Muriel Tinkler
(74) *Attorney, Agent, or Firm* — Howard IP Law Group, PC

(57) ABSTRACT

A computer implemented data processing system and method processes data relating to a deferred annuity contract during the accumulation phase for a relevant life. The system is configured to determine an amount of an available benefit payment, available on a periodic basis for withdrawal without reduction of a payment base value, the available benefit payment amount being based on a withdrawal percent value and one of a payment base value and a contract value. The withdrawal percent value increases automatically after a first of the benefit payments.

20 Claims, 10 Drawing Sheets

U.S. PATENT DOCUMENTS

| | | | |
|---|---|---|---|
| 7,113,913 B1 | 9/2006 | Davis et al. | |
| 7,124,088 B2 | 10/2006 | Bauer et al. | |
| 7,376,608 B1* | 5/2008 | Dellinger et al. | 705/36 R |
| 7,398,241 B2 | 7/2008 | Fay et al. | |
| 7,613,644 B1 | 11/2009 | Abbs et al. | |
| 7,624,058 B1 | 11/2009 | Abbs et al. | |
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |
| 2002/0194098 A1 | 12/2002 | Stiff et al. | |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2003/0171956 A1 | 9/2003 | Cox et al. | |
| 2003/0187764 A1 | 10/2003 | Abbs et al. | |
| 2004/0039601 A1 | 2/2004 | Anderson | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0010453 A1 | 1/2005 | Terlizzi et al. | |
| 2005/0060251 A1 | 3/2005 | Schwartz et al. | |
| 2005/0080698 A1 | 4/2005 | Perg et al. | |
| 2005/0144103 A1 | 6/2005 | Perg et al. | |
| 2005/0144124 A1 | 6/2005 | Stiff et al. | |
| 2005/0177473 A1 | 8/2005 | Angle | |
| 2005/0234821 A1* | 10/2005 | Benham et al. | 705/40 |
| 2006/0074787 A1 | 4/2006 | Perg et al. | |
| 2006/0080148 A1 | 4/2006 | Koresko | |
| 2006/0085338 A1 | 4/2006 | Stiff et al. | |
| 2006/0089892 A1 | 4/2006 | Sullivan et al. | |
| 2006/0095353 A1 | 5/2006 | Midlam | |
| 2006/0111997 A1* | 5/2006 | Abbott et al. | 705/35 |
| 2006/0111998 A1 | 5/2006 | Fisher et al. | |
| 2006/0143055 A1 | 6/2006 | Loy et al. | |
| 2006/0149651 A1 | 7/2006 | Robinson | |
| 2006/0155622 A1 | 7/2006 | Laux | |
| 2006/0190373 A1 | 8/2006 | Perg et al. | |
| 2006/0195375 A1 | 8/2006 | Bohn | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2006/0242052 A1 | 10/2006 | Long et al. | |
| 2007/0011063 A1 | 1/2007 | Shelon et al. | |
| 2007/0011069 A1 | 1/2007 | Bevacqua | |
| 2007/0011086 A1 | 1/2007 | Dellinger et al. | |
| 2007/0021986 A1 | 1/2007 | Cheung et al. | |
| 2007/0033124 A1 | 2/2007 | Herr et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1 | 5/2007 | Bonvouloir | |
| 2007/0100726 A1 | 5/2007 | O'Flinn et al. | |
| 2007/0100727 A1 | 5/2007 | Multer et al. | |
| 2007/0106589 A1 | 5/2007 | Schirripa | |
| 2007/0130035 A1 | 6/2007 | Carden | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2008/0010095 A1 | 1/2008 | Joyce | |
| 2008/0071661 A1 | 3/2008 | Jeudy et al. | |
| 2008/0189223 A1 | 8/2008 | Baiye | |
| 2008/0270194 A1 | 10/2008 | West et al. | |

OTHER PUBLICATIONS

Panko, Ron. New Products. Best's Review, 108(3), Jul. 24, 2007.
Antolin, Pablo. Longevity Risk and Private Pensions. Financial Market Trends,(92), 107,109-128. Jun. 2007.
Yates, Karen E & Liss, Stephen. Charitable Lead Annuity Trusts-A Primer. Taxation of Exempts, 19(1), Jul. 23, 2007.
Harshman, Scott & Schaller, Gordon. Private Annuities: An Income Tax Deferral Technique. Orange County Business Journal, 29(39), A56-A57. Sep. 2006.
Accelerated Death Benefits, http://www.medicare.gov/LongTermCare/Static/AccDeathBenefits.asp?dest=NAV%; no later than Jul. 23, 2007.
Alternatives to Long Term Care Insurance, http://www.senior-wealth-protection-advocates.com/long-term-care-insurance-alternatives.html; no later than Jul. 23, 2007.
American Skandia Life Assurance Corpt/CT, publisher: Edgar Online, dated Dec. 31, 2007.
Anonymous, "Q2 2005 American Eqty Invt Life HLD Co Earnings Conference Call-Final", August 4, 2005, Fair Disclosure Wire.
Anonymous, "Full disclosure variable life report. (Policy Analysis)", Nov. 13, 2006, National Underwriter Life & Health, v110, n43, p. 30.
Anonymous, "Risk Management: You've Come a Long Way, Baby", Aug. 1, 2005, Annuity Market News.
Blodget, H., Money for Nothing: The Real Trouble with Mutual Funds, Slate.com, Dec. 1, 2004.
Stout, R.G. et al.; "Dynamic Retirement Withdrawal Planning"; Financial Services Review 15 (2006) 117-131.
Facts about the New York Life Longevity Benefit Variable Annuity Product, New York Life Insurance Company, May 2007.
"Fidelity.com Glossary"; https://scs.fidelity.com/webxpress/help/topics/help_definition_p.shtml, no. later than Jul. 23, 2007.
Form 485BPOS, (Apr. 26, 2006), Transamerica-NewLTC-LifetimeGMWB_May2006SECFiling.pdf.
Penn Mutual Variable Annuity Account III, Sec Form 497, Filed Oct. 2, 2006.
Form N-4, Transamerica Life Insurance Company; Separate Account VA Y; filed Feb. 22, 2006.
Glossary of Insurance Terms, http://www.iii.org/media/glossary/; no later than Jul. 23, 2007.
Income Select for Life; https://www.transamericaadvisor.com/contentServer/MediaServer? uri=/site/tciidex/media/PDF/Annuities _ TCI/Client_Approved_Material/Tips_and _Techniques/.BRIS.pdf; May 2007.
"Jackson Enhances Living Benefit Options within its Perspective Family of Variable Annuities"; http://findarticles.com/p/articles/mi_m0EiN/is_2007_April_30/ai_n19041944, Apr. 30, 2007.
"Just the Facts: The Best of America All American Gold Annuity Key Facts"; Nationwide Financial Services, Inc.; https://ssc.nwseivicecenter.com/media/pdf/product/VAM-0504AO-FLpdf; Mar. 2006.
"Key to Making Retirement Savings Last: The Withdrawal Rate"; http://www.newyorklife.com/cda/0,3254,141.98,00.html; no later than Jul. 23, 2007.
Lifetime Legacy, http://www.americo.com/lifetime/lifetimelegacy.html, no later than Jul. 23, 2007.
"Making IRAs Last a Lifetime with Annuities"; http://www.fpamd.org/documents/MakingIRAsLastaLifetimewithAnnuities.pdf; Mar. 2006.
New York Life Longevity Benefit Variable Annuity Brochure, New York Life Insurance Company, May 2007.
New York Life Longevity Benefit Variable Annuity FactSheet, New York Life Insurance Company, May 2007.
New York Life Longevity Benefit Variable Annuity Prospectus Amendment dated Aug. 15, 2007, New York Life Insurance Company, Aug. 2007.
Pacific One Select Investor Guide; (Nov. 2007) http://www.mutualfunds.pacificlife.com/public/mutual_funds/product_info/individual_k/pdfs/d5026.pdf.
Paradis, T., More Funds Adopt Performance-Based Fees, Washingtonpost.com (Associated Press), Apr. 8, 2007.
Prospectus, Penn Mutual Variable Annuity Account III, Enhanced Credit Variable Annuity; May 1, 2007.
"Prudential Investments Introduces Strategic Partners Annuity One; New Variable Annuity Offers Investors World-Class Money Managers and Flexible Product Features"; http://findarticles.com/p/articles/mi_m0EIN/is_2000_Oct_9/ai_65846822.
Retireonyourterms; http://www.retireonyourterms.com/ glossary/GlossaryText.htm,no later than Jul. 23, 2007.

RiverSource Innovations Select Variable Annuity; http://www.riversource.com/rvsc/global/docs/INNOV-SELECT-NY-AAG.pdf, no later than Jul. 23, 2007.

"Scudder Investments Introduces Two New Variable Annuity Products with Travelers Life & Annuity", Jun. 9, 2003, PR newswire, pp. 1-4.

Shapiro et al. "Separating Annuity Buyers by Fixed vs. Variable", April 5, 1993, National Underwriter Life.Health.Financial Services), V97, N14, pp. 20-21.

The Power and Protection of Income Annuities, (Empire Fidelity Investments Life Insurance Company), http //personal.fidelity.com/products/annuities/pdf/IncomeAnnuitySpecialReport.pdf, Mar. 2006.

Granza, Lee et al.; "Financing long -term care: Employee needs and attitudes, and the employer's role"; Benefits Quarterly, Brookfield: 4th qtr 1988. vol. 14, Iss. 4, 13 pgs.

Pizzani, Lori; "Annuity Helps with Long-Term Care", Annuity Market News, Sep. 1, 1999, 2 pgs.

Anonymous; Part IV: Insurance: Protecting What You've Got—Chapter 16: Insurance on You: Life, Disability and Health; Personal Finance for Dummies (5th ed.); Hoboken: 2006, 23 pgs.

* cited by examiner

Fig. 9

| Age | Lifetime Benefit Payment based on Method A | Lifetime Benefit Payment based on Method B |
|---|---|---|
| 60 | $5,000 | $5,000 |
| 61 | $5,000 | $5,000 |
| 62 | $5,000 | $5,000 |
| 63 | $5,000 | $5,000 |
| 64 | $5,000 | $5,000 |
| 65 | $5,000 | $5,500 |
| 66 | $5,000 | $5,500 |
| 67 | $5,000 | $5,500 |
| 68 | $5,000 | $5,500 |
| 69 | $5,000 | $5,500 |
| 70 | $5,000 | $6,000 |
| 71 | $5,000 | $6,000 |
| 72 | $5,000 | $6,000 |
| 73 | $5,000 | $6,000 |
| 74 | $5,000 | $6,000 |
| 75 | $5,000 | $6,500 |
| 76 | $5,000 | $6,500 |
| 77 | $5,000 | $6,500 |
| 78 | $5,000 | $6,500 |
| 79 | $5,000 | $6,500 |
| 80 | $5,000 | $7,000 |
| 81 | $5,000 | $7,000 |
| 82 | $5,000 | $7,000 |
| 83 | $5,000 | $7,000 |
| 84 | $5,000 | $7,000 |
| 85 | $5,000 | $7,000 |

US 8,103,573 B2

METHOD AND SYSTEM FOR PROCESSING DATA FOR A DEFERRED ANNUITY WITH AVAILABLE BENEFIT PAYMENTS RELATED TO AN INCREASING WITHDRAWAL PERCENT

CROSS-REFERENCE TO RELATED APPLICATIONS

This application is a continuation application of co-pending U.S. patent application Ser. No. 11/983,473 entitled METHOD AND SYSTEM FOR A DEFERRED VARIABLE ANNUITY WITH LIFETIME BENEFIT PAYMENTS GOVERNED BY AN AGE-BASED WITHDRAWAL PERCENT, filed Nov. 9, 2007, which application claims priority to U.S. Provisional Patent Application Ser. No. 60/961,735, filed Jul. 24, 2007, the entire contents of all of which are herein incorporated by reference for all purposes.

BACKGROUND OF THE INVENTION

1. Field of the Invention

The present invention relates to a method and system for administering a variable annuity with lifetime benefit payments; and more particularly, to a data processing method for administering a deferred variable annuity contract, the annuity contract having a payment base value, a contract value, and lifetime benefit payments, wherein the lifetime benefit payment being related to a withdrawal percent and the withdrawal percent automatically increasing over the term of the annuity contract.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life which transfers some portion or all of the risk of outliving one's accumulated assets to the insurer.

One basis for distinguishing commonly available deferred annuities is whether the annuity is classified as a "fixed annuity" or a "variable annuity".

In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee". The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds or sub-accounts may include stocks, bonds, money market instruments, mutual funds, and the like.

Variable annuity contracts typically provide a death benefit. Oftentimes during the accumulation period this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life's death. Further, if the annuity contract does not provide a guarantee (discussed below), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider.

Most deferred variable annuity products in the prior art typically determine the amount of the lifetime benefit payments, if any, to be a predetermined percentage of a withdrawal base. The withdrawal base amount is typically set at the time of the first lifetime benefit payment and is fixed for the remainder of the term of the annuity product. Furthermore, the predetermined percentage, or withdrawal percent, is typically set at the time of the first lifetime benefit payment and is fixed for the remainder of the term of the annuity product.

Many financial products and systems have been disclosed. These include: a reinsurance system or plan for a variable annuity contract with guaranteed minimum death benefit; a means for determining a guaranteed minimum death benefit claim value from the variable annuity contract; investment consulting, benefit projection and investment analysis of retirement investments during a pre-retirement accumulation phase and post-retirement distribution phase; investment portfolio selection, allocation, and management to generate sustainable withdrawals wherein the distribution amount is, at least in part, based upon a performance level of individual investments; generating annuity payments using a dynamic asset allocation investment wherein the annuity payment(s) are based on the performance of the automatically allocated assets; and financial instrument(s) providing a guaranteed growth rate and a guarantee of lifetime payments wherein a first guarantee of a protected value is established wherein the protected value includes at least a certain amount based upon the initial account balance growing at a minimum growth rate for a defined period of time, or until one or more defined events occur. Each one of these prior art references suffers from at least the following disadvantage(s): the lifetime benefit payment, if any, is based on a withdrawal percent that does not automatically increase over the term of the annuity contract; the lifetime benefit payment, if any, is determined based on a fixed predetermined percentage of a withdrawal base; and the withdrawal base is typically fixed for the remainder of the contract or, alternatively, decreases during the remainder of the term.

Accordingly, there remains a need in the art for a data processing method for administering a variable annuity contract for a relevant life wherein the annuity contract has lifetime benefit payments and wherein the lifetime benefit payment for each period is related to a withdrawal percent and wherein the withdrawal percent automatically increases over the term of the annuity contract.

SUMMARY OF THE INVENTION

The present invention provides a data processing method for administering a deferred variable annuity contract during the accumulation phase wherein the annuity contract has a guarantee of lifetime benefit payments and wherein the lifetime benefit payment for each period is related to a withdrawal percent, and the withdrawal percent automatically increases over the term of the annuity contract. In prior art annuity products, the amount of the lifetime benefit payments, if any, is determined to be a fixed predetermined percentage of a withdrawal base. This withdrawal base typically is fixed for the remainder of the contract, or alternatively, decreases for the remainder of the term. The fixed percentage is typically set at the time of the first lifetime benefit payment.

On the other hand, the data processing method and system of the invention maintains an annuity with lifetime benefit payments, wherein the lifetime benefit payment for each period is related to a withdrawal percent and wherein the withdrawal percent automatically increases over the term of the annuity contract. The data processing method administers an annuity contract having a payment base value, a contract value, together with lifetime benefit payments.

Generally stated, the method of the invention determines a payment base for the annuity contract. Preferably, the payment base value is a function of the previous premium payments and withdrawals by the relevant life, and could include investment performance on an annual or other basis (daily, monthly, etc.). The method determines a withdrawal percent for the annuity contract. During the accumulation phase the system performs the following steps: (i) determining a withdrawal percent, and (ii) if requested by the relevant life, or if other defined criteria are reached, determining a lifetime benefit payment withdrawal for the relevant life which decreases the contract value, wherein the lifetime benefit payment is related to the withdrawal percent and wherein the withdrawal percent automatically increases over the term of the annuity contract. Additional premium payments and withdrawals in excess of the lifetime benefit payment will affect the payment base value. The method further determines a benefit amount for the annuity contract that is equal to the premium payments minus any lifetime benefit payments or withdrawals. Upon the death of the relevant life, the present method pays a death benefit to a beneficiary, wherein in one embodiment the death benefit is equal to the present benefit amount.

Preferably, the annuity contract of the data processing method is a deferred variable annuity and further includes sub-accounts whose market performance can cause the contract value to decrease. In other aspects of the invention, the annuity contract may be selected from the group of fixed, combination variable/fixed, and equity indexed annuities.

In addition, the account may be subject to M, E & A, 12 b-1 and fund level charges. These charges may or may not be assessed against the contract value.

The guaranteed death benefit is paid to the beneficiary only if the relevant life dies during the accumulation phase. However, a guaranteed death benefit may also be payable during annuitization as well. The lifetime benefit payment may be paid once yearly or periodically throughout the year; however, there is a maximum lifetime benefit payment for any given year. In prior art annuity products, the relevant life receives lifetime benefit payments that are based on a fixed withdrawal base, which is typically determined at the time of the first lifetime benefit payment. On the other hand, the present method allows the relevant life to have the opportunity to request a lifetime benefit payment during each period that is based on a withdrawal percent that automatically increases over the term of the annuity contract and therefore increases with the age of the relevant life. Therefore, the lifetime benefit payment is not based on a fixed percentage of a withdrawal base amount, and the withdrawal percent may increase depending on the age of the relevant life. Accordingly, the relevant life has the opportunity to request a lifetime benefit payment that has the potential to afford a greater monetary value then the lifetime benefit payments of prior art annuity products.

In one aspect, the value of the annuity payments, if necessary, equals the value of the last guaranteed lifetime benefit payment. In other aspects, excess withdrawals, required minimum distributions or step-ups could cause the value of the annuity payments or guaranteed lifetime benefit payments to change.

In another aspect of the invention, there is provided a data processing method for administering a deferred variable annuity contract, the annuity contract having a payment base, a contract value and lifetime benefit payments, comprising the steps of: (i) determining a present payment base value; (ii) determining a present contract value; (iii) determining a withdrawal percent; and (iv) calculating a lifetime benefit payment, wherein the lifetime benefit payment is related to the withdrawal percent and wherein the withdrawal percent automatically increases over the term of the annuity contract. The invention can comprise a deferred variable annuity contract having (i) means for determining a present payment base; (ii) means for determining a present contract value; (iii) means for determining a withdrawal percent; (iv) means for calculating a lifetime benefit payment; wherein the lifetime benefit payment is related to the withdrawal percent and wherein the withdrawal percent automatically increases over the term of the annuity contract.

In another embodiment, the present invention comprises a data processing system for administering a deferred variable annuity contract having a payment base, a contract value and lifetime benefit payments, comprising: a storage device; a processor coupled to the storage device, the storage device storing instructions that are utilized by the processor, the instructions comprising: (i) determining a present payment base; (ii) determining a present contract value; (iii) determining a withdrawal percent; (iv) calculating a lifetime benefit payment; wherein the lifetime benefit payment is related to the withdrawal percent and wherein the withdrawal percent automatically increases over the term of the annuity contract.

The present invention solves several of the problems associated with conventional administration of annuity contracts. Determination of the lifetime benefit payment is accomplished via an improved formula that provides the potential to afford a greater monetary value for the lifetime benefit payment than prior art annuity contracts. The relevant life is afforded increased security by the availability of a potentially enhanced lifetime benefit payment as they become older.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 9 depicts a table illustrating lifetime benefit payments as a function of age for annuities associated with various methods in accordance with an embodiment of the present invention.

DESCRIPTION OF THE PREFERRED EMBODIMENTS

Figure 1:
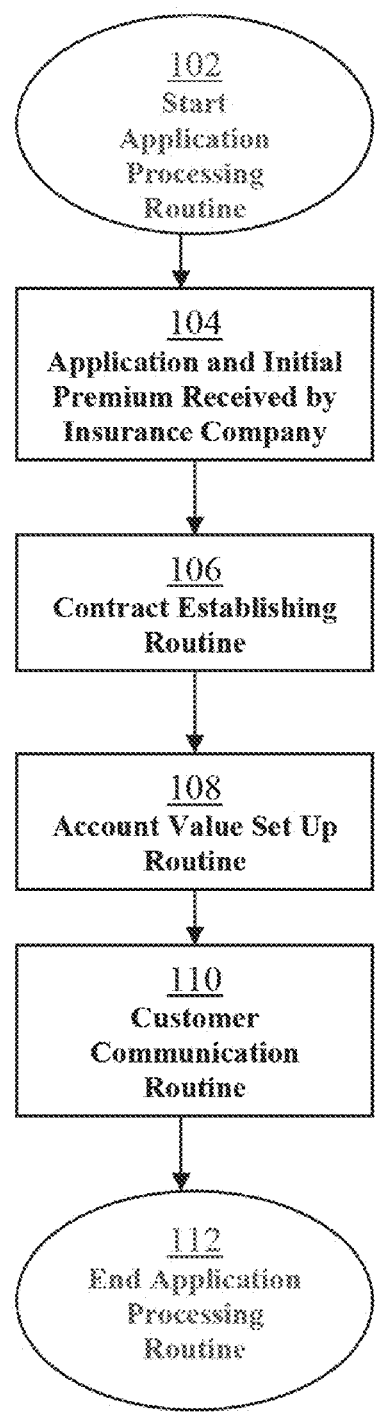
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing method for administering a deferred variable annuity contract having a payment base, a contract value, and lifetime benefit payments. The withdrawal percent used to calculate the lifetime benefit is not a fixed percentage. Instead, the withdrawal percent automatically increases over the term of the annuity contract and with the age of the relevant life. The present data processing method is preferably in the form of a rider to a variable annuity contract. In another aspect of the invention, the present data processing method is not in the form of a rider, but is a part of the base contract. In exchange for paying higher fees, the relevant life receives several advantages by selecting the method and system of the present invention which provides a lifetime benefit payment available for each period wherein the lifetime benefit payment is related to a withdrawal percent and wherein the withdrawal percent automatically increases over the term of the annuity contract and with the age of the relevant life. These advantages include the following: the relevant life will have the opportunity to request a lifetime benefit payment during each period that is related to a withdrawal percent and wherein the withdrawal percent automatically increases over the term of the annuity contract and with the age of the relevant life. Therefore, the lifetime benefit payment is not based on a fixed percentage of a withdrawal base amount, and the withdrawal percent will automatically increase over the term of the annuity contract and with the age of the relevant life.

Accordingly, as long as the withdrawal base amount is not decreased by withdrawals exceeding the lifetime benefit payment amount, the relevant life has the opportunity to request a lifetime benefit payment that has the potential to afford a greater monetary value than prior art annuity products. Significantly, the relevant life takes advantage of the higher withdrawal percent as the relevant life ages, as measured at the anniversary date of each contract period. Therefore, the relevant life is given the opportunity to receive higher lifetime benefit payments in their later years, which will help offset the effects of inflation and help offset the increased medical costs that may be associated with old age. Further, the living benefit payments can increase without having to defer the first withdrawal in order to receive the increase. The present invention provides that living benefit payments can increase during retirement years to pay for escalating medical expenses faced during retirement. Typically higher benefits are only available during a deferral period, but the present invention allows higher benefits during the time in which payments are received.

The present invention comprises a data processing method for administering a deferred variable annuity contract for a relevant life, the annuity contract having a payment base, a contract value and lifetime benefit payments, comprising the steps of: (i) determining a present payment base; (ii) determining a present contract value; (iii) determining a withdrawal percent; and (iv) calculating a lifetime benefit payment wherein the lifetime benefit payment is related to the withdrawal percent and wherein the withdrawal percent automatically increases over the term of the annuity contract.

In another embodiment, the present invention comprises a data processing system for administering a deferred variable annuity contract having a payment base, a contract value and lifetime benefit payments, comprising: a storage device; a processor coupled to the storage device, the storage device storing instructions that are utilized by the processor, the instructions comprising: (a) an instruction for determining a present payment base; (b) an instruction for determining a present contract value; (c) an instruction for determining a withdrawal percent; (d) an instruction for calculating a lifetime benefit payment; wherein the lifetime benefit payment is related to the withdrawal percent and wherein the withdrawal percent automatically increases over the term of the annuity contract.

It should be understood that as used herein the term "periodically" includes method steps that in certain aspects may only be performed once. In other aspects, such "periodically" performed method steps may be performed more than once as described herein.

The following definitions are given hereunder to better understand terms used in the specification.

"Relevant Life" or "Covered Life": The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

"Withdrawal Base": The withdrawal base is the amount used in one embodiment of the present invention to determine the lifetime benefit payment. Preferably, the withdrawal base may be equal to the amount of the original premium, the payment base value, the contract value, or the greater of the payment base value and the contract value.

"Payment Base": The payment base (PB) (or more accurately the payment base value) is the amount used in one embodiment of the present invention to determine the lifetime benefit payment and the rider charge. In one embodiment of the present invention, the initial payment base value equals the initial premium.

"Premium": 100% of the dollar amount of the initial or subsequent premium payments deposited into the contract before application of any sales charges or payment enhancements.

"Withdrawal Request": A request made by the relevant life to withdraw funds during the "accumulation phase" of the contract. One type of withdrawal is a lifetime benefit payment. Any withdrawal that is in excess of the lifetime benefit payment may: (i) decrease the contract value below the minimum contract value; (ii) decrease the payment base value; and (iii) decrease the guaranteed death benefit.

"Lifetime Benefit Payment": A benefit payment that is available until the death of the relevant life. The lifetime benefit payment may be paid yearly in one embodiment. The total lifetime benefit payment for the year may also be distributed monthly, quarterly or any other defined period. Preferably, the lifetime benefit payment is only available if the covered life age is 60 (or other predetermined age) or older. Preferably, if the relevant life is age 59 (or other predetermined age) or younger, the LBP is equal to zero. Other age restrictions can also be utilized for the lifetime benefit payment. Preferably, the lifetime benefit payment is determined by one of the following formulas:

LBP=the greater of:

"the guaranteed lifetime benefit payment" (the payment base value)×(the withdrawal percent); and "the maximum lifetime benefit payment" (the present contract value)×(the withdrawal percent).

It should be understood that in other embodiments of the present invention, other formulas may be utilized for determining the lifetime benefit payment.

"Contract Value": The contract value (CV) is a numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks and bonds.

"Withdrawal": Also known as a "surrender", a relevant life may withdraw up to the contract value at any time.

"Death Benefit": The death benefit provision guarantees that upon the death of the relevant life a death benefit (DB) is paid to a beneficiary named in the contract that is equal to the benefit amount. In an alternative embodiment, the death benefit is equal to the greater of the guaranteed death benefit or the contract value as of the date that proof of death is received. It should be understood that in other embodiments of the present invention, other formulas may be utilized for determining the guaranteed death benefit.

"Benefit Amount": In one embodiment of the present invention, the benefit amount is used to calculate that amount of the death benefit. Preferably, the benefit amount is equal to the premium payments minus any lifetime benefit payments or withdrawals.

"AMF": Annual Maintenance Fee.

"Annuity Commencement Date": The annuity commencement date (ACD) is the date upon which the contract enters the "annuitization phase".

"Withdrawal Percent": In one embodiment of the present invention, the withdrawal percent (WP) is used to determine the amount of the lifetime benefit payment. It should be understood that in other embodiments of the present invention, other formulas may be utilized for determining the lifetime benefit payment.

"PB increase": Payment Base increase.

"Step-Up": An increase to the payment base value that is available if the contract value increases because of favorable performance of the underlying investments. Preferably, the step-up is guaranteed at a predetermined percentage.

"High Water Mark": A predetermined threshold. In one embodiment, the high water mark is equal to the previously highest contract value (minus the rider fee) as determined at periodic time intervals.

"Partial Surrender": Partial surrender means the gross amount of the partial surrender and will include any applicable contingent deferred sales charges.

"Covered Life Change": Any contractual change before ACD which causes a change in the covered life will result in a reset in the benefits provided under the rider and allows the issuing company to impose the fund allocation restrictions.

"Annuity Contract": The term annuity contract means a set of rules and other data that are reflected in a computer processing system for operations of the annuity product.

"Issue Rules": The issuance of a contract may be subject to established requirements known as issue rules.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the contract or rider effective date. If a non-natural owner—the covered life is the annuitant on the contract or rider effective date. All age-contingent benefit provisions are based on the attained age of the oldest covered life.

Joint/Spousal Continuation Election:

The covered life is both the owner and the owner's spouse. The owner and the annuitant must be the same person. The spouse of the owner must be the contingent annuitant. If a natural owner, the spouse of the owner must be named as the contingent annuitant and as the beneficiary. A joint owner who is not the owner's spouse is not allowed. A beneficiary who is not the owner's spouse is not allowed. All age-based benefit provisions are based on the attained age of the youngest covered life.

Setting UP the Contract—Joint Life Elections

For non-qualified contracts where both husband and wife are owners on the contract, one of the owners is the annuitant, the other is the contingent annuitant, and as beneficiary. Where either the husband or the wife is the owner, and there is no joint owner, the owner is the annuitant and the spouse is the contingent annuitant and the beneficiary.

For qualified contracts, where either the husband or wife is the owner, the owner is annuitant and the spouse is the contingent annuitant and the beneficiary. If a non-natural owner, the husband or wife is annuitant, the spouse is the contingent annuitant and the beneficiary. The spousal information must be placed in the contingent annuitant field.

Issues Rules

Issue rules are set forth to provide a more complete understanding of one illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. The riders are not available if any covered life or annuitant is age 81 (or other predetermined age) or greater on the rider effective date. The rider must be elected on contract issue, the election is irrevocable.

The contract owner must elect, at issue, either joint life or single life. The election is irrevocable. The contract owner must be the annuitant. If joint contract owners, one must be the annuitant and the other must be the contingent annuitant. The spouse must be the sole primary beneficiary.

Calculation of the Withdrawal Percent (WP) for Single Life Elections

The Withdrawal Percent (WP) is used to determine the amount of the lifetime benefit payment. The WP is determined at the later of the contract issue date, the rider effective date, or a change in the covered life. The WP may increase automatically on contract anniversaries based on the attained age of the oldest covered life on the current contract anniversary. If a withdrawal occurs within the first five contract years, the WP schedule below will not increase. The WP will remain equal to the WP percentage at the time of the first withdrawal.

The WP attained age schedule is:
5.0% for attained ages 60 to 64;
5.5% for attained ages 65 to 69;
6.0% for attained ages 70 to 74;
6.5% for attained ages 75 to 79;
7.0% for attained ages 80 and above.
Other WP attained age schedules are permitted.

Calculation of the Withdrawal Percent (WP) for Joint Life Elections

The withdrawal percent is used to determine the amount of the lifetime benefit payment. The WP is determined on the later of the contract issue date, the rider effective date, or a change in the covered life. The WP may increase automatically on contract anniversaries based on the attained age of the youngest covered life on the current contract anniversary. If a withdrawal occurs within the first five contract years, the WP schedule below will not increase. The WP will remain equal to the WP percentage at the time of the first withdrawal.

The WP attained age schedule is:
4.5% for attained ages 60 to 64;
5.0% for attained ages 65 to 69;
5.5% for attained ages 70 to 74;
6.0% for attained ages 75 to 79;
6.5% for attained ages 80 and above.
Other WP attained age schedules are permitted.

Calculation of the Benefit Amount

The benefit amount (BA) is the amount available to be paid as a death benefit under the terms of the rider. If this rider is effective on the contract issue date, then the BA equals the initial premium at the rider effective date. If the rider is effective after the contract issue date, then the BA equals 100% of the dollar amount of the contract value on the rider effective date, less any payment enhancements received in the last 12 months.

When subsequent premium payments are received, the BA will be increased by 100% of the dollar amount of the subsequent premium payment(s). Whenever a partial surrender is made prior to the contract anniversary immediately following the covered life's $60^{th}$ birthday (or other predetermined age), the BA is reset to the greater of zero or the lesser of (i) or (ii) as follows:
 (i) the contract value immediately following the partial surrender; or
 (ii) the BA immediately prior to the partial surrender, less the amount of partial surrender.

Whenever a partial surrender is made on or after the contract anniversary immediately following the covered life's $60^{th}$ birthday (or other predetermined age), the BA will be equal to the amount determined in either (i), (ii) or (iii) as follows:
 (i) If the total partial surrenders since the most recent contract anniversary are equal to or less than the lifetime benefit payment (LBP), the BA becomes the BA immediately prior to the partial surrender, less the amount of partial surrender.
 (ii) If the total partial surrenders since most recent contract anniversary are more than the LBP, but all partial surrenders were paid under the Automatic Income RMD (AI RMD), the BA becomes the BA immediately prior to the partial surrender, less the amount of partial surrender.
 (iii) If the total partial surrenders since the most recent contract anniversary exceed the total LBP and the AI RMD exception in (B) does not apply, the BA is reset to the greater of zero or the lesser of (A) or (B) as follows:
  (A) the contract value immediately following the partial surrender; or
  (B) the BA immediately prior to the partial surrender, less the amount of partial surrender.

The maximum BA is $5,000,000.

Example 1: Monthly Benefit Amount Calculation, No Withdrawals - Assumes Single Life Election, Covered Life is Age 60 at Issue.

| Age | Date | Premium BOM | Contract Value BOM | Surrender Amount | Contract Value EOM | Benefit Amount EOM |
|---|---|---|---|---|---|---|
| 60 | Jan. 1, 2005 | $100,000 | $100,000 | $0 | $100,200 | $100,000 |
| 60 | Feb. 1, 2005 | $0 | $100,200 | $0 | $100,501 | $100,000 |
| 60 | Mar. 1, 2005 | $0 | $100,501 | $0 | $101,305 | $100,000 |
| 60 | Apr. 1, 2005 | $100,000 | $201,305 | $0 | $201,707 | $200,000 |
| 60 | May 1, 2005 | $0 | $201,707 | $0 | $203,724 | $200,000 |
| 60 | Jun. 1, 2005 | $0 | $203,724 | $0 | $215,948 | $200,000 |
| 60 | Jul. 1, 2005 | $0 | $215,948 | $0 | $217,027 | $200,000 |
| 60 | Aug. 1, 2005 | $0 | $217,027 | $0 | $218,330 | $200,000 |
| 60 | Sep. 1, 2005 | $0 | $218,330 | $0 | $216,146 | $200,000 |
| 60 | Oct. 1, 2005 | $0 | $216,146 | $0 | $211,823 | $200,000 |
| 60 | Nov. 1, 2005 | $0 | $211,823 | $0 | $212,883 | $200,000 |
| 60 | Dec. 1, 2005 | $0 | $212,883 | $0 | $213,521 | $200,000 |
| 61 | Jan. 1, 2006 | $0 | $213,521 | $0 | $214,375 | $200,000 |
| 61 | Feb. 1, 2006 | $0 | $214,375 | $0 | $215,447 | $200,000 |
| 61 | Mar. 1, 2006 | $50,000 | $265,447 | $0 | $266,243 | $250,000 |
| 61 | Apr. 1, 2006 | $0 | $266,243 | $0 | $267,308 | $250,000 |

Example Notes:

Lines in grey indicate subsequent premium payments.

Calculation of the Payment Base (PB)

The Payment Base (PB) (or more accurately payment base value) is the amount used to determine the lifetime benefit payment (LBP) and the rider fee. At the rider effective date, the PB equals the benefit amount. When subsequent premium payments are received, the PB is reset to equal the benefit amount. Whenever a partial surrender is made prior to the contract anniversary immediately following the covered life's $60^{th}$ birthday (or other predetermined age), the PB is reset to equal the benefit amount. Whenever a partial surrender is made on or after the contract anniversary immediately following the covered life's $60^{th}$ birthday (or other predetermined age), which exceeds the lifetime benefit payment and all partial surrenders were not paid under the Automatic Income RMD (AI RMD), the PB is reset to equal the benefit amount.

Example 2: Expand example 1 to show Payment Base - Assumes Single Life Election, Covered Life is Age 60 at Issue.

| Age | Date | Premium BOM | Contract Value BOM | Surrender Amount | Contract Value EOM | Benefit Amount EOM | Payment Base EOM |
|---|---|---|---|---|---|---|---|
| 60 | Jan. 1, 2005 | $100,000 | $100,000 | $0 | $100,200 | $100,000 | $100,000 |
| 60 | Feb. 1, 2005 | $0 | $100,200 | $0 | $100,501 | $100,000 | $100,000 |
| 60 | Mar. 1, 2005 | $0 | $100,501 | $0 | $101,305 | $100,000 | $100,000 |
| 60 | Apr. 1, 2005 | $100,000 | $201,305 | $0 | $201,707 | $200,000 | $200,000 |
| 60 | May 1, 2005 | $0 | $201,707 | $0 | $203,724 | $200,000 | $200,000 |
| 60 | Jun. 1, 2005 | $0 | $203,724 | $0 | $215,948 | $200,000 | $200,000 |
| 60 | Jul. 1, 2005 | $0 | $215,948 | $0 | $217,027 | $200,000 | $200,000 |
| 60 | Aug. 1, 2005 | $0 | $217,027 | $0 | $218,330 | $200,000 | $200,000 |
| 60 | Sep. 1, 2005 | $0 | $218,330 | $0 | $216,146 | $200,000 | $200,000 |
| 60 | Oct. 1, 2005 | $0 | $216,146 | $0 | $211,823 | $200,000 | $200,000 |
| 60 | Nov. 1, 2005 | $0 | $211,823 | $0 | $212,883 | $200,000 | $200,000 |
| 60 | Dec. 1, 2005 | $0 | $212,883 | $0 | $213,521 | $200,000 | $200,000 |
| 61 | Jan. 1, 2006 | $0 | $213,521 | $0 | $214,375 | $200,000 | $200,000 |
| 61 | Feb. 1, 2006 | $0 | $214,375 | $0 | $215,447 | $200,000 | $200,000 |
| 61 | Mar. 1, 2006 | $50,000 | $265,447 | $0 | $266,243 | $250,000 | $250,000 |
| 61 | Apr. 1, 2006 | $0 | $266,243 | $0 | $267,308 | $250,000 | $250,000 |

Calculation of the Lifetime Benefit Payment

Single Life Elections

For single life elections, the lifetime benefit payment (LBP) is available until the death of any covered life.

Joint Life Elections

For joint life elections, the lifetime benefit payment (LBP) is available until the death of last surviving spouse.

If the covered life is age 60 (or other predetermined age) or older on the rider effective date, the LBP is equal to the payment base multiplied by the WP for the covered life's attained age.

If the covered life is age 59 (or other predetermined age) or younger on the rider effective date, the LBP is equal to zero.

On any contract anniversary immediately following the covered life's $60^{th}$ birthday (or other predetermined age), the LBP is equal to the payment base multiplied by the WP for the covered life's attained age on the most recent contract anniversary. When a subsequent premium payment is made after the contract anniversary immediately following the covered life's $60^{th}$ birthday (or other predetermined age), the LBP is equal to the WP for the covered life's attained age, on the most recent contract anniversary, times PB immediately after the subsequent premium is received.

Whenever a partial surrender is made after the contract anniversary immediately following the covered life's $60^{th}$ birthday (or other predetermined age), the LBP will be equal to zero. During the deferral stage, subsequent premiums may be made to re-establish the PB and the LBP. The LBP will be equal to the any of the following.

(i) If the total partial surrenders since the most recent contract anniversary are equal to or less than the current lifetime benefit payment (LBP), the LBP is equal to the LBP immediately prior to the partial surrender.

(ii) If the total partial surrenders since the most recent contract anniversary are more than the LBP, but all partial surrenders were paid under the Automatic Income Required Minimum Distribution (AI RMD), the provisions of (i) above will apply.

(iii) If the total partial surrenders since the most recent contract anniversary are more than the current LBP and the AI RMD exception in (ii) above does not apply, the LBP is reset to the PB immediately after the partial surrender times the WP for the covered life's attained age on the most recent contract anniversary.

The contract owner may request an amount less than, equal to, or greater than the lifetime benefit payment. Total partial surrenders taken during a contract year on or after the contract anniversary immediately following the covered life's $60^{th}$ birthday (or other predetermined age) which exceed the LBP may reduce future LBP values and may reduce the BA and the PB. If the total amount requested by the contract owner during a contract year is less than the lifetime benefit payment, the excess cannot be carried over to increase future years' lifetime benefit payments.

Example 3: Expand Example 2 to Show LBP Amount, No Withdrawals.
Assumes Single Life Election, Covered Life is 60 at Issue

| Age | Date | Premium BOM | Contract Value BOM | Surrender Amount | Contract Value EOM | Benefit Amount EOM | Payment Base EOM | Monthly LBP |
|---|---|---|---|---|---|---|---|---|
| 60 | Jan. 1, 2005 | $100,000 | $100,000 | $0 | $100,200 | $100,000 | $100,000 | $416.67 |
| 60 | Feb. 1, 2005 | $0 | $100,200 | $0 | $100,501 | $100,000 | $100,000 | $416.67 |
| 60 | Mar. 1, 2005 | $0 | $100,501 | $0 | $101,305 | $100,000 | $100,000 | $416.67 |
| 60 | Apr. 1, 2005 | $100,000 | $201,305 | $0 | $201,707 | $200,000 | $200,000 | $833.33 |
| 60 | May 1, 2005 | $0 | $201,707 | $0 | $203,724 | $200,000 | $200,000 | $833.33 |
| 60 | Jun. 1, 2005 | $0 | $203,724 | $0 | $215,948 | $200,000 | $200,000 | $833.33 |
| 60 | Jul. 1, 2005 | $0 | $215,948 | $0 | $217,027 | $200,000 | $200,000 | $833.33 |
| 60 | Aug. 1, 2005 | $0 | $217,027 | $0 | $218,330 | $200,000 | $200,000 | $833.33 |
| 60 | Sep. 1, 2005 | $0 | $218,330 | $0 | $216,146 | $200,000 | $200,000 | $833.33 |
| 60 | Oct. 1, 2005 | $0 | $216,146 | $0 | $211,823 | $200,000 | $200,000 | $833.33 |
| 60 | Nov. 1, 2005 | $0 | $211,823 | $0 | $212,883 | $200,000 | $200,000 | $833.33 |
| 60 | Dec. 1, 2005 | $0 | $212,883 | $0 | $213,521 | $200,000 | $200,000 | $833.33 |
| 61 | Jan. 1, 2006 | $0 | $213,521 | $0 | $214,375 | $200,000 | $200,000 | $833.33 |
| 61 | Feb. 1, 2006 | $0 | $214,375 | $0 | $215,447 | $200,000 | $200,000 | $833.33 |
| 61 | Mar. 1, 2006 | $50,000 | $265,447 | $0 | $266,243 | $250,000 | $250,000 | $1,041.67 |
| 61 | Apr. 1, 2006 | $0 | $266,243 | $0 | $267,308 | $250,000 | $250,000 | $1,041.67 |

Example Notes:
The monthly LBP is not a defined term; it is used here for illustration only and equals the contract year LBP divided by 12.

Example 4: Expand Example 3 to Show LBP Amount Attained Age Increases, No Withdrawals. Assumes Single Life Election, Covered Life is 60 at Issue

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 60 | Jan. 1, 2005 | $100,000 | $100,000 | $0 | $100,200 | $100,000 | $100,000 | 5.0% | $5,000 |
| 60 | Feb. 1, 2005 | $0 | $100,200 | $0 | $100,501 | $100,000 | $100,000 | 5.0% | $5,000 |
| 60 | Mar. 1, 2005 | $0 | $100,501 | $0 | $101,305 | $100,000 | $100,000 | 5.0% | $5,000 |
| 60 | Apr. 1, 2005 | $100,000 | $201,305 | $0 | $201,707 | $200,000 | $200,000 | 5.0% | $10,000 |
| 60 | May 1, 2005 | $0 | $201,707 | $0 | $203,724 | $200,000 | $200,000 | 5.0% | $10,000 |
| 60 | Jun. 1, 2005 | $0 | $203,724 | $0 | $215,948 | $200,000 | $200,000 | 5.0% | $10,000 |
| 60 | Jul. 1, 2005 | $0 | $215,948 | $0 | $217,027 | $200,000 | $200,000 | 5.0% | $10,000 |
| 60 | Aug. 1, 2005 | $0 | $217,027 | $0 | $218,330 | $200,000 | $200,000 | 5.0% | $10,000 |
| 60 | Sep. 1, 2005 | $0 | $218,330 | $0 | $216,146 | $200,000 | $200,000 | 5.0% | $10,000 |
| 60 | Oct. 1, 2005 | $0 | $216,146 | $0 | $211,823 | $200,000 | $200,000 | 5.0% | $10,000 |
| 60 | Nov. 1, 2005 | $0 | $211,823 | $0 | $212,883 | $200,000 | $200,000 | 5.0% | $10,000 |
| 60 | Dec. 1, 2005 | $0 | $212,883 | $0 | $213,521 | $200,000 | $200,000 | 5.0% | $10,000 |
| 61 | Jan. 1, 2006 | $0 | $213,521 | $0 | $214,375 | $200,000 | $200,000 | 5.0% | $10,000 |
| 61 | Feb. 1, 2006 | $0 | $214,375 | $0 | $215,447 | $200,000 | $200,000 | 5.0% | $10,000 |
| 61 | Mar. 1, 2006 | $50,000 | $265,447 | $0 | $266,243 | $250,000 | $250,000 | 5.0% | $12,500 |
| 61 | Apr. 1, 2006 | $0 | $266,243 | $0 | $267,308 | $250,000 | $250,000 | 5.0% | $12,500 |
| 62 | Jan. 1, 2007 | $0 | $267,308 | $0 | $267,843 | $250,000 | $250,000 | 5.0% | $12,500 |
| 63 | Jan. 1, 2008 | $0 | $267,843 | $0 | $268,647 | $250,000 | $250,000 | 5.0% | $12,500 |
| 64 | Jan. 1, 2009 | $0 | $268,647 | $0 | $270,796 | $250,000 | $250,000 | 5.0% | $12,500 |
| 65 | Jan. 1, 2010 | $0 | $270,796 | $0 | $271,337 | $250,000 | $250,000 | 5.5% | $13,750 |
| 66 | Jan. 1, 2011 | $0 | $271,337 | $0 | $274,051 | $250,000 | $250,000 | 5.5% | $13,750 |
| 67 | Jan. 1, 2012 | $0 | $274,051 | $0 | $290,494 | $250,000 | $250,000 | 5.5% | $13,750 |
| 68 | Jan. 1, 2013 | $0 | $290,494 | $0 | $291,946 | $250,000 | $250,000 | 5.5% | $13,750 |
| 69 | Jan. 1, 2014 | $0 | $291,946 | $0 | $293,698 | $250,000 | $250,000 | 5.5% | $13,750 |
| 70 | Jan. 1, 2015 | $0 | $293,698 | $0 | $290,761 | $250,000 | $250,000 | 6.0% | $15,000 |
| 71 | Jan. 1, 2016 | $0 | $290,761 | $0 | $284,946 | $250,000 | $250,000 | 6.0% | $15,000 |
| 72 | Jan. 1, 2017 | $0 | $284,946 | $0 | $286,370 | $250,000 | $250,000 | 6.0% | $15,000 |
| 73 | Jan. 1, 2018 | $0 | $286,370 | $0 | $287,230 | $250,000 | $250,000 | 6.0% | $15,000 |
| 74 | Jan. 1, 2019 | $0 | $287,230 | $0 | $288,379 | $250,000 | $250,000 | 6.0% | $15,000 |
| 75 | Jan. 1, 2020 | $0 | $288,379 | $0 | $289,820 | $250,000 | $250,000 | 6.5% | $16,250 |
| 76 | Jan. 1, 2021 | $0 | $289,820 | $0 | $290,690 | $250,000 | $250,000 | 6.5% | $16,250 |
| 77 | Jan. 1, 2022 | $0 | $290,690 | $0 | $291,853 | $250,000 | $250,000 | 6.5% | $16,250 |
| 78 | Jan. 1, 2023 | $0 | $291,853 | $0 | $292,436 | $250,000 | $250,000 | 6.5% | $16,250 |
| 79 | Jan. 1, 2024 | $0 | $292,436 | $0 | $293,314 | $250,000 | $250,000 | 6.5% | $16,250 |
| 80 | Jan. 1, 2025 | $0 | $293,314 | $0 | $295,660 | $250,000 | $250,000 | 7.0% | $17,500 |
| 81 | Jan. 1, 2026 | $0 | $295,660 | $0 | $296,251 | $250,000 | $250,000 | 7.0% | $17,500 |

Example Notes:
The time scale jumps to yearly at age 62.
The WP increases on the contract anniversary immediately following the $65^{th}$, $70^{th}$, $75^{th}$, and $80^{th}$ birthdays of the covered life.

Example 5: Expand Example 4 to Show Effect of LBP Withdrawals. Assumes Single Life Election, Covered Life Was 55 at Issue

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 60 | Jan. 1, 2005 | $100,000 | $100,000 | $0 | $100,200 | $100,000 | $100,000 | 5.0% | $5,000 |
| 60 | Feb. 1, 2005 | $0 | $100,200 | $0 | $100,501 | $100,000 | $100,000 | 5.0% | $5,000 |
| 60 | Mar. 1, 2005 | $0 | $100,501 | $0 | $101,305 | $100,000 | $100,000 | 5.0% | $5,000 |
| 60 | Apr. 1, 2005 | $100,000 | $201,305 | $0 | $201,707 | $200,000 | $200,000 | 5.0% | $10,000 |
| 60 | May 1, 2005 | $0 | $201,707 | $0 | $203,724 | $200,000 | $200,000 | 5.0% | $10,000 |
| 60 | Jun. 1, 2005 | $0 | $203,724 | $0 | $215,948 | $200,000 | $200,000 | 5.0% | $10,000 |
| 60 | Jul. 1, 2005 | $0 | $215,948 | $0 | $217,027 | $200,000 | $200,000 | 5.0% | $10,000 |
| 60 | Aug. 1, 2005 | $0 | $217,027 | $0 | $218,330 | $200,000 | $200,000 | 5.0% | $10,000 |
| 60 | Sep. 1, 2005 | $0 | $218,330 | $0 | $216,146 | $200,000 | $200,000 | 5.0% | $10,000 |
| 60 | Oct. 1, 2005 | $0 | $216,146 | $0 | $211,823 | $200,000 | $200,000 | 5.0% | $10,000 |
| 60 | Nov. 1, 2005 | $0 | $211,823 | $0 | $212,883 | $200,000 | $200,000 | 5.0% | $10,000 |

Example 5: Expand Example 4 to Show Effect of LBP Withdrawals.
Assumes Single Life Election, Covered Life Was 55 at Issue

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 60 | Dec. 1, 2005 | $0 | $212,883 | $0 | $213,521 | $200,000 | $200,000 | 5.0% | $10,000 |
| 61 | Jan. 1, 2006 | $0 | $213,521 | $0 | $214,375 | $200,000 | $200,000 | 5.0% | $10,000 |
| 61 | Feb. 1, 2006 | $0 | $214,375 | $0 | $215,447 | $200,000 | $200,000 | 5.0% | $10,000 |
| 61 | Mar. 1, 2006 | $50,000 | $265,447 | $0 | $266,243 | $250,000 | $250,000 | 5.0% | $12,500 |
| 61 | Apr. 1, 2006 | $0 | $266,243 | $0 | $267,308 | $250,000 | $250,000 | 5.0% | $12,500 |
| 62 | Jan. 1, 2007 | $0 | $267,308 | $12,500 | $255,318 | $237,500 | $250,000 | 5.0% | $12,500 |
| 63 | Jan. 1, 2008 | $0 | $255,318 | $12,500 | $243,547 | $225,000 | $250,000 | 5.0% | $12,500 |
| 64 | Jan. 1, 2009 | $0 | $243,547 | $12,500 | $232,895 | $212,500 | $250,000 | 5.0% | $12,500 |
| 65 | Jan. 1, 2010 | $0 | $232,895 | $12,500 | $220,836 | $200,000 | $250,000 | 5.5% | $13,750 |
| 66 | Jan. 1, 2011 | $0 | $220,836 | $13,750 | $209,157 | $186,250 | $250,000 | 5.5% | $13,750 |
| 67 | Jan. 1, 2012 | $0 | $209,157 | $13,750 | $207,131 | $172,500 | $250,000 | 5.5% | $13,750 |
| 68 | Jan. 1, 2013 | $0 | $207,131 | $13,750 | $194,348 | $158,750 | $250,000 | 5.5% | $13,750 |
| 69 | Jan. 1, 2014 | $0 | $194,348 | $13,750 | $181,681 | $145,000 | $250,000 | 5.5% | $13,750 |
| 70 | Jan. 1, 2015 | $0 | $181,681 | $13,750 | $166,252 | $131,250 | $250,000 | 6.0% | $15,000 |
| 71 | Jan. 1, 2016 | $0 | $166,252 | $15,000 | $148,227 | $116,250 | $250,000 | 6.0% | $15,000 |
| 72 | Jan. 1, 2017 | $0 | $148,227 | $15,000 | $133,893 | $101,250 | $250,000 | 6.0% | $15,000 |
| 73 | Jan. 1, 2018 | $0 | $133,893 | $15,000 | $119,250 | $86,250 | $250,000 | 6.0% | $15,000 |
| 74 | Jan. 1, 2019 | $0 | $119,250 | $15,000 | $104,667 | $71,250 | $250,000 | 6.0% | $15,000 |
| 75 | Jan. 1, 2020 | $0 | $104,667 | $15,000 | $90,115 | $56,250 | $250,000 | 6.5% | $16,250 |
| 76 | Jan. 1, 2021 | $0 | $90,115 | $16,250 | $74,087 | $40,000 | $250,000 | 6.5% | $16,250 |
| 77 | Jan. 1, 2022 | $0 | $74,087 | $16,250 | $58,068 | $23,750 | $250,000 | 6.5% | $16,250 |
| 78 | Jan. 1, 2023 | $0 | $58,068 | $16,250 | $41,902 | $7,500 | $250,000 | 6.5% | $16,250 |
| 79 | Jan. 1, 2024 | $0 | $41,902 | $16,250 | $25,729 | $0 | $250,000 | 6.5% | $16,250 |
| 80 | Jan. 1, 2025 | $0 | $25,729 | $16,250 | $9,555 | $0 | $250,000 | 7.0% | $17,500 |
| 81 | Jan. 1, 2026 | $0 | $9,555 | $17,500 | $0 | $0 | $250,000 | 7.0% | $17,500 |

Example Notes:
Since the partial surrenders do not exceed the LBP, the partial surrenders only affect the BA not the PB.

Example 6: Expand Example 5 to Show Effect of Withdrawals Exceeding LBP.
Assumes Single Life Election, Covered Life Was 55 at Issue

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 60 | Jan. 1, 2005 | $100,000 | $100,000 | $0 | $100,200 | $100,000 | $100,000 | 5.0% | $5,000 |
| 60 | Feb. 1, 2005 | $0 | $100,200 | $0 | $100,501 | $100,000 | $100,000 | 5.0% | $5,000 |
| 60 | Mar. 1, 2005 | $0 | $100,501 | $0 | $101,305 | $100,000 | $100,000 | 5.0% | $5,000 |
| 60 | Apr. 1, 2005 | $100,000 | $201,305 | $0 | $201,707 | $200,000 | $200,000 | 5.0% | $10,000 |
| 60 | May 1, 2005 | $0 | $201,707 | $0 | $203,724 | $200,000 | $200,000 | 5.0% | $10,000 |
| 60 | Dec. 1, 2005 | $0 | $212,883 | $0 | $213,521 | $200,000 | $200,000 | 5.0% | $10,000 |
| 61 | Jan. 1, 2006 | $0 | $213,521 | $0 | $214,375 | $200,000 | $200,000 | 5.0% | $10,000 |
| 61 | Feb. 1, 2006 | $0 | $214,375 | $0 | $215,447 | $200,000 | $200,000 | 5.0% | $10,000 |
| 61 | Mar. 1, 2006 | $50,000 | $265,447 | $0 | $266,243 | $250,000 | $250,000 | 5.0% | $12,500 |
| 61 | Apr. 1, 2006 | $0 | $266,243 | $0 | $267,308 | $250,000 | $250,000 | 5.0% | $12,500 |
| 62 | Jan. 1, 2007 | $0 | $267,308 | $12,500 | $255,318 | $237,500 | $250,000 | 5.0% | $12,500 |
| 63 | Jan. 1, 2008 | $0 | $255,318 | $12,500 | $243,547 | $225,000 | $250,000 | 5.0% | $12,500 |
| 64 | Jan. 1, 2009 | $0 | $243,547 | $12,500 | $232,895 | $212,500 | $250,000 | 5.0% | $12,500 |
| 65 | Jan. 1, 2010 | $0 | $232,895 | $12,500 | $220,836 | $200,000 | $250,000 | 5.5% | $13,750 |
| 66 | Jan. 1, 2011 | $0 | $220,836 | $13,750 | $209,157 | $186,250 | $250,000 | 5.5% | $13,750 |
| 67 | Jan. 1, 2012 | $0 | $209,157 | $13,750 | $207,131 | $172,500 | $250,000 | 5.5% | $13,750 |
| 68 | Jan. 1, 2013 | $0 | $207,131 | $13,750 | $194,348 | $158,750 | $250,000 | 5.5% | $13,750 |
| 69 | Jan. 1, 2014 | $0 | $194,348 | $13,750 | $181,681 | $145,000 | $250,000 | 5.5% | $13,750 |
| 70 | Jan. 1, 2015 | $0 | $181,681 | $13,750 | $166,252 | $131,250 | $250,000 | 6.0% | $15,000 |
| 71 | Jan. 1, 2016 | $0 | $166,252 | $20,000 | $143,327 | $111,250 | $111,250 | 6.0% | $6,675 |
| 72 | Jan. 1, 2017 | $0 | $143,327 | $6,675 | $137,335 | $104,575 | $111,250 | 6.0% | $6,675 |
| 73 | Jan. 1, 2018 | $0 | $137,335 | $6,675 | $131,052 | $97,900 | $111,250 | 6.0% | $6,675 |
| 74 | Jan. 1, 2019 | $0 | $131,052 | $6,675 | $124,875 | $91,225 | $111,250 | 6.0% | $6,675 |
| 75 | Jan. 1, 2020 | $0 | $124,875 | $6,675 | $118,791 | $84,550 | $111,250 | 6.5% | $7,231 |
| 76 | Jan. 1, 2021 | $0 | $118,791 | $7,231 | $111,894 | $77,319 | $111,250 | 6.5% | $7,231 |
| 77 | Jan. 1, 2022 | $0 | $111,894 | $7,231 | $105,082 | $70,088 | $111,250 | 6.5% | $7,231 |
| 78 | Jan. 1, 2023 | $0 | $105,082 | $7,231 | $98,046 | $62,856 | $111,250 | 6.5% | $7,231 |
| 79 | Jan. 1, 2024 | $0 | $98,046 | $7,231 | $91,087 | $55,625 | $111,250 | 6.5% | $7,231 |
| 80 | Jan. 1, 2025 | $0 | $91,087 | $7,231 | $84,527 | $48,394 | $111,250 | 7.0% | $7,788 |

Example 6: Expand Example 5 to Show Effect of Withdrawals Exceeding LBP.
Assumes Single Life Election, Covered Life Was 55 at Issue

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 81 | Jan. 1, 2026 | $0 | $84,527 | $7,788 | $76,893 | $40,606 | $111,250 | 7.0% | $7,788 |
| 82 | Jan. 1, 2027 | $0 | $76,893 | $9,000 | $16,973 | $16,973 | $16,973 | 7.0% | $1,188 |

Example Notes:

The partial surrender at age 71 exceeds the LBP. Therefore the BA is reset to the lesser of the contract value after the partial surrender or the BA prior to the partial surrender less the amount of the partial surrender. In this case, the BA prior to the partial surrender less the amount of the partial surrender is less than the contract value.

The surrender at age 82 exceeds the LBP. Therefore the BA is reset to the lesser of the contract value after the surrender, or the BA less the amount of the partial surrender. In this case, the contract value after the surrender is less than the BA prior to the surrender less the amount of the surrender.

For both withdrawals exceeding the LBP, the PB is reset to the BA after the partial surrender and the LBP is reset to the PB times the WP for the attained age of the covered life.

Example 7: Expand Example 6 to Show Effect of Withdrawals Exceeding LBP.
Assumes Joint Life Election, Covered Life Was 55 at Issue.

| Age | Date | Premium BOM | Contract Value BOM | Surrender Amount | Contract Value EOM | Benefit Amount EOM | Payment Base EOM | WP | Annual LBP |
|---|---|---|---|---|---|---|---|---|---|
| 60 | Jan. 1, 2005 | $100,000 | $100,000 | $0 | $100,200 | $100,000 | $100,000 | 4.5% | $4,500 |
| 60 | Feb. 1, 2005 | $0 | $100,200 | $0 | $100,501 | $100,000 | $100,000 | 4.5% | $4,500 |
| 60 | Mar. 1, 2005 | $0 | $100,501 | $0 | $101,305 | $100,000 | $100,000 | 4.5% | $4,500 |
| 60 | Apr. 1, 2005 | $100,000 | $201,305 | $0 | $201,707 | $200,000 | $200,000 | 4.5% | $9,000 |
| 60 | May 1, 2005 | $0 | $201,707 | $0 | $203,724 | $200,000 | $200,000 | 4.5% | $9,000 |
| 60 | Dec. 1, 2005 | $0 | $212,883 | $0 | $213,521 | $200,000 | $200,000 | 4.5% | $9,000 |
| 61 | Jan. 1, 2006 | $0 | $213,521 | $0 | $214,375 | $200,000 | $200,000 | 4.5% | $9,000 |
| 61 | Feb. 1, 2006 | $0 | $214,375 | $0 | $215,447 | $200,000 | $200,000 | 4.5% | $9,000 |
| 61 | Mar. 1, 2006 | $50,000 | $265,447 | $0 | $266,243 | $250,000 | $250,000 | 4.5% | $11,250 |
| 61 | Apr. 1, 2006 | $0 | $266,243 | $0 | $267,308 | $250,000 | $250,000 | 4.5% | $11,250 |
| 62 | Jan. 1, 2007 | $0 | $267,308 | $11,250 | $256,571 | $238,750 | $250,000 | 4.5% | $11,250 |
| 63 | Jan. 1, 2008 | $0 | $256,571 | $11,250 | $246,057 | $227,500 | $250,000 | 4.5% | $11,250 |
| 64 | Jan. 1, 2009 | $0 | $246,057 | $11,250 | $236,685 | $216,250 | $250,000 | 4.5% | $11,250 |
| 65 | Jan. 1, 2010 | $0 | $236,685 | $11,250 | $225,886 | $205,000 | $250,000 | 5.0% | $12,500 |
| 66 | Jan. 1, 2011 | $0 | $225,886 | $12,500 | $215,520 | $192,500 | $250,000 | 5.0% | $12,500 |
| 67 | Jan. 1, 2012 | $0 | $215,520 | $12,500 | $215,201 | $180,000 | $250,000 | 5.0% | $12,500 |
| 68 | Jan. 1, 2013 | $0 | $215,201 | $12,500 | $203,714 | $167,500 | $250,000 | 5.0% | $12,500 |
| 69 | Jan. 1, 2014 | $0 | $203,714 | $12,500 | $192,362 | $155,000 | $250,000 | 5.0% | $12,500 |
| 70 | Jan. 1, 2015 | $0 | $192,362 | $12,500 | $178,063 | $142,500 | $250,000 | 5.5% | $13,750 |
| 71 | Jan. 1, 2016 | $0 | $178,063 | $20,000 | $154,902 | $122,500 | $122,500 | 5.5% | $6,738 |
| 72 | Jan. 1, 2017 | $0 | $154,902 | $6,738 | $148,905 | $115,763 | $122,500 | 5.5% | $6,738 |
| 73 | Jan. 1, 2018 | $0 | $148,905 | $6,738 | $142,594 | $109,025 | $122,500 | 5.5% | $6,738 |
| 74 | Jan. 1, 2019 | $0 | $142,594 | $6,738 | $136,400 | $102,288 | $122,500 | 5.5% | $6,738 |
| 75 | Jan. 1, 2020 | $0 | $136,400 | $6,738 | $130,311 | $95,550 | $122,500 | 6.0% | $7,350 |
| 76 | Jan. 1, 2021 | $0 | $130,311 | $7,350 | $123,330 | $88,200 | $122,500 | 6.0% | $7,350 |
| 77 | Jan. 1, 2022 | $0 | $123,330 | $7,350 | $116,444 | $80,850 | $122,500 | 6.0% | $7,350 |
| 78 | Jan. 1, 2023 | $0 | $116,444 | $7,350 | $109,312 | $73,500 | $122,500 | 6.0% | $7,350 |
| 79 | Jan. 1, 2024 | $0 | $109,312 | $7,350 | $102,268 | $66,150 | $122,500 | 6.0% | $7,350 |
| 80 | Jan. 1, 2025 | $0 | $102,268 | $7,350 | $95,677 | $58,800 | $122,500 | 6.5% | $7,963 |
| 81 | Jan. 1, 2026 | $0 | $95,677 | $7,963 | $87,890 | $50,838 | $122,500 | 6.5% | $7,963 |
| 82 | Jan. 1, 2027 | $0 | $87,890 | $9,000 | $19,723 | $19,723 | $19,723 | 6.5% | $1,282 |

Example Notes:
The partial surrender at age 71 exceeds the LBP. Therefore the BA is reset to the lesser of the contract value after the partial surrender or the BA prior to the partial surrender less the amount of the partial surrender. In this case, the BA prior to the partial surrender less the amount of the partial surrender is less than the contract value.

The surrender at age 82 exceeds the LBP. Therefore the BA is reset to the lesser of the contract value after the surrender, or the BA less the amount of the partial surrender. In this case, the contract value after the surrender is less than the BA prior to the surrender less the amount of the surrender.

For both withdrawals exceeding the LBP, the PB is reset to the BA after the partial surrender and the LBP is reset to the PB times the WP for the attained age of the covered life.

Example 8: Show Effect of Withdrawals Prior to Age 60.
Assumes Single Life Election, Covered Life is 50 at Issue.

| Age | Date | Premium BOY | Contract Value BOY | Surrender Amount BOY | Contract Value EOY | Benefit Amount EOY | Payment Base EOY | WP EOY | Annual LBP |
|---|---|---|---|---|---|---|---|---|---|
| 55 | Jan. 1, 2005 | $100,000 | $100,000 | $0 | $102,000 | $100,000 | $100,000 | 0.0% | $0 |
| 56 | Jan. 1, 2006 | $0 | $102,000 | $0 | $92,820 | $100,000 | $100,000 | 0.0% | $0 |
| 57 | Jan. 1, 2007 | $0 | $92,820 | $10,000 | $75,366 | $75,366 | $75,366 | 0.0% | $0 |
| 58 | Jan. 1, 2008 | $0 | $75,366 | $0 | $71,598 | $75,366 | $75,366 | 0.0% | $0 |
| 59 | Jan. 1, 2009 | $0 | $71,598 | $0 | $75,894 | $75,366 | $75,366 | 0.0% | $0 |
| 60 | Jan. 1, 2010 | $0 | $75,894 | $3,768 | $73,568 | $71,598 | $75,366 | 5.0% | $3,768 |
| 61 | Jan. 1, 2011 | $0 | $73,568 | $3,768 | $71,894 | $67,830 | $75,366 | 5.0% | $3,768 |
| 62 | Jan. 1, 2012 | $0 | $71,894 | $3,768 | $70,851 | $64,062 | $75,366 | 5.0% | $3,768 |
| 63 | Jan. 1, 2013 | $0 | $70,851 | $3,768 | $67,753 | $60,293 | $75,366 | 5.0% | $3,768 |
| 64 | Jan. 1, 2014 | $0 | $67,753 | $3,768 | $67,184 | $56,525 | $75,366 | 5.0% | $3,768 |
| 65 | Jan. 1, 2015 | $0 | $67,184 | $3,768 | $68,489 | $52,757 | $75,366 | 5.5% | $4,145 |
| 66 | Jan. 1, 2016 | $0 | $68,489 | $4,145 | $60,483 | $48,612 | $75,366 | 5.5% | $4,145 |
| 67 | Jan. 1, 2017 | $0 | $60,483 | $4,145 | $58,028 | $44,466 | $75,366 | 5.5% | $4,145 |
| 68 | Jan. 1, 2018 | $0 | $58,028 | $4,145 | $56,039 | $40,321 | $75,366 | 5.5% | $4,145 |
| 69 | Jan. 1, 2019 | $0 | $56,039 | $4,145 | $54,488 | $36,176 | $75,366 | 5.5% | $4,145 |
| 70 | Jan. 1, 2020 | $0 | $54,488 | $4,145 | $47,322 | $32,031 | $75,366 | 6.0% | $4,522 |
| 71 | Jan. 1, 2021 | $0 | $47,322 | $4,522 | $41,944 | $27,509 | $75,366 | 6.0% | $4,522 |
| 72 | Jan. 1, 2022 | $0 | $41,944 | $4,522 | $37,422 | $22,987 | $75,366 | 6.0% | $4,522 |
| 73 | Jan. 1, 2023 | $0 | $37,422 | $4,522 | $34,545 | $18,465 | $75,366 | 6.0% | $4,522 |
| 74 | Jan. 1, 2024 | $0 | $34,545 | $4,522 | $32,726 | $13,943 | $75,366 | 6.0% | $4,522 |
| 75 | Jan. 1, 2025 | $0 | $32,726 | $4,522 | $29,332 | $9,421 | $75,366 | 6.5% | $4,899 |
| 76 | Jan. 1, 2026 | $0 | $29,332 | $4,899 | $25,166 | $4,522 | $75,366 | 6.5% | $4,899 |
| 77 | Jan. 1, 2027 | $0 | $25,166 | $4,899 | $20,470 | $0 | $75,366 | 6.5% | $4,899 |

Example Notes:
The partial surrender at age 57 reduces the BA to the lesser of the contract value after the surrender or the BA prior to the surrender, less the amount of the surrender. In this case, the contract value after the surrender is the lesser value.
The LBP at age 60 is the WP times the PB at age 60.
LBP is zero until client is age 60.
Client is 55 at issue, so 5 year wait is satisfied before first surrender Example 9: Show Effect of Withdrawals at Age 61.
Assumes Single Life Election, Covered Life is 60 at Issue.

| Age | Date | Premium BOY | Contract Value BOY | Surrender Amount BOY | Contract Value EOY | Benefit Amount EOY | Payment Base EOY | WP EOY | Annual LBP |
|---|---|---|---|---|---|---|---|---|---|
| 60 | Jan. 1, 2005 | $100,000 | $100,000 | $0 | $102,000 | $100,000 | $100,000 | 5.0% | $5,000 |
| 61 | Jan. 1, 2006 | $0 | $102,000 | $5,000 | $88,270 | $95,000 | $100,000 | 5.0% | $5,000 |
| 62 | Jan. 1, 2007 | $0 | $88,270 | $5,000 | $75,776 | $90,000 | $100,000 | 5.0% | $5,000 |
| 63 | Jan. 1, 2008 | $0 | $75,776 | $5,000 | $67,237 | $85,000 | $100,000 | 5.0% | $5,000 |
| 64 | Jan. 1, 2009 | $0 | $67,237 | $5,000 | $65,971 | $80,000 | $100,000 | 5.0% | $5,000 |
| 65 | Jan. 1, 2010 | $0 | $65,971 | $3,768 | $63,447 | $76,232 | $100,000 | 5.0% | $5,000 |
| 66 | Jan. 1, 2011 | $0 | $63,447 | $5,000 | $60,201 | $71,232 | $100,000 | 5.0% | $5,000 |
| 67 | Jan. 1, 2012 | $0 | $60,201 | $5,000 | $57,409 | $66,232 | $100,000 | 5.0% | $5,000 |
| 68 | Jan. 1, 2013 | $0 | $57,409 | $5,000 | $52,933 | $61,232 | $100,000 | 5.0% | $5,000 |
| 69 | Jan. 1, 2014 | $0 | $52,933 | $5,000 | $50,329 | $56,232 | $100,000 | 5.0% | $5,000 |
| 70 | Jan. 1, 2015 | $0 | $50,329 | $5,000 | $48,956 | $51,232 | $100,000 | 5.0% | $5,000 |
| 71 | Jan. 1, 2016 | $0 | $48,956 | $5,000 | $41,318 | $46,232 | $100,000 | 5.0% | $5,000 |
| 72 | Jan. 1, 2017 | $0 | $41,318 | $5,000 | $37,408 | $41,232 | $100,000 | 5.0% | $5,000 |

-continued

Example 9: Show Effect of Withdrawals at Age 61.
Assumes Single Life Election, Covered Life is 60 at Issue.

| Age | Date | Premium BOY | Contract Value BOY | Surrender Amount BOY | Contract Value EOY | Benefit Amount EOY | Payment Base EOY | WP EOY | Annual LBP |
|---|---|---|---|---|---|---|---|---|---|
| 73 | Jan. 1, 2018 | $0 | $37,408 | $5,000 | $33,704 | $36,232 | $100,000 | 5.0% | $5,000 |
| 74 | Jan. 1, 2019 | $0 | $33,704 | $5,000 | $30,139 | $31,232 | $100,000 | 5.0% | $5,000 |
| 75 | Jan. 1, 2020 | $0 | $30,139 | $5,000 | $23,631 | $26,232 | $100,000 | 5.0% | $5,000 |
| 76 | Jan. 1, 2021 | $0 | $23,631 | $5,000 | $18,258 | $21,232 | $100,000 | 5.0% | $5,000 |
| 77 | Jan. 1, 2022 | $0 | $18,258 | $5,000 | $13,258 | $16,232 | $100,000 | 5.0% | $5,000 |
| 78 | Jan. 1, 2023 | $0 | $13,258 | $5,000 | $8,671 | $11,232 | $100,000 | 5.0% | $5,000 |
| 79 | Jan. 1, 2024 | $0 | $8,671 | $5,000 | $4,002 | $6,232 | $100,000 | 5.0% | $5,000 |
| 80 | Jan. 1, 2025 | $0 | $4,002 | $5,000 | $0 | $1,232 | $100,000 | 5.0% | $5,000 |
| 81 | Jan. 1, 2026 | $0 | $0 | $5,000 | $0 | $0 | $100,000 | 5.0% | $5,000 |
| 82 | Jan. 1, 2027 | $0 | $0 | $5,000 | $0 | $0 | $100,000 | 5.0% | $5,000 |

Example Notes: —Client is 60 at issue, so 5 year wait is not satisfied before first surrender.
WP does not increase.

Example 10: Expand Example 7 to show effect of Rider Fee

| Age | Date | Premium BOM | Account Value BOM | Surrender Amount BOM | Account Value EOM | Benefit Amount EOM | Payment Base EOM | Annual LBP | Rider Fee |
|---|---|---|---|---|---|---|---|---|---|
| 60 | Jan. 1, 2005 | $100,000 | $100,000 | $0 | $100,200 | $100,000 | $100,000 | $4,500 | $0 |
| 60 | Feb. 1, 2005 | $0 | $100,200 | $0 | $100,501 | $100,000 | $100,000 | $4,500 | $0 |
| 60 | Mar. 1, 2005 | $0 | $100,501 | $0 | $101,305 | $100,000 | $100,000 | $4,500 | $0 |
| 60 | Apr. 1, 2005 | $100,000 | $201,305 | $0 | $201,707 | $200,000 | $200,000 | $9,000 | $0 |
| 60 | May 1, 2005 | $0 | $201,707 | $0 | $203,724 | $200,000 | $200,000 | $9,000 | $0 |
| 60 | Dec. 1, 2005 | $0 | $212,883 | $0 | $213,521 | $200,000 | $200,000 | $9,000 | $0 |
| 61 | Jan. 1, 2006 | $0 | $212,721 | $0 | $213,572 | $200,000 | $200,000 | $9,000 | $800 |
| 61 | Feb. 1, 2006 | $0 | $213,572 | $0 | $214,640 | $200,000 | $200,000 | $9,000 | $0 |
| 61 | Mar. 1, 2006 | $50,000 | $264,640 | $0 | $265,434 | $250,000 | $250,000 | $11,250 | $0 |
| 61 | Apr. 1, 2006 | $0 | $265,434 | $0 | $266,496 | $250,000 | $250,000 | $11,250 | $0 |
| 62 | Jan. 1, 2007 | $0 | $265,496 | $11,250 | $254,754 | $238,750 | $250,000 | $11,250 | $1,000 |
| 63 | Jan. 1, 2008 | $0 | $253,754 | $11,250 | $243,232 | $227,500 | $250,000 | $11,250 | $1,000 |
| 64 | Jan. 1, 2009 | $0 | $242,232 | $11,250 | $232,829 | $216,250 | $250,000 | $11,250 | $1,000 |
| 65 | Jan. 1, 2010 | $0 | $231,829 | $11,250 | $221,021 | $205,000 | $250,000 | $12,500 | $1,000 |
| 66 | Jan. 1, 2011 | $0 | $220,021 | $12,500 | $209,596 | $192,500 | $250,000 | $12,500 | $1,000 |
| 67 | Jan. 1, 2012 | $0 | $208,596 | $12,500 | $207,862 | $180,000 | $250,000 | $12,500 | $1,000 |
| 68 | Jan. 1, 2013 | $0 | $206,862 | $12,500 | $195,333 | $167,500 | $250,000 | $12,500 | $1,000 |
| 69 | Jan. 1, 2014 | $0 | $194,333 | $12,500 | $182,924 | $155,000 | $250,000 | $12,500 | $1,000 |
| 70 | Jan. 1, 2015 | $0 | $181,924 | $12,500 | $167,730 | $142,500 | $250,000 | $13,750 | $1,000 |
| 71 | Jan. 1, 2016 | $0 | $167,240 | $20,000 | $144,295 | $122,500 | $122,500 | $6,738 | $490 |
| 72 | Jan. 1, 2017 | $0 | $143,805 | $6,738 | $137,753 | $115,763 | $122,500 | $6,738 | $490 |
| 73 | Jan. 1, 2018 | $0 | $137,263 | $6,738 | $130,917 | $109,025 | $122,500 | $6,738 | $490 |
| 74 | Jan. 1, 2019 | $0 | $130,427 | $6,738 | $124,184 | $102,288 | $122,500 | $6,738 | $490 |
| 75 | Jan. 1, 2020 | $0 | $123,694 | $6,738 | $117,542 | $95,550 | $122,500 | $7,350 | $490 |
| 76 | Jan. 1, 2021 | $0 | $117,052 | $7,350 | $110,031 | $88,200 | $122,500 | $7,350 | $490 |
| 77 | Jan. 1, 2022 | $0 | $109,541 | $7,350 | $102,600 | $80,850 | $122,500 | $7,350 | $490 |
| 78 | Jan. 1, 2023 | $0 | $102,110 | $7,350 | $94,949 | $73,500 | $122,500 | $7,350 | $490 |
| 79 | Jan. 1, 2024 | $0 | $94,459 | $7,350 | $87,370 | $66,150 | $122,500 | $7,350 | $490 |
| 80 | Jan. 1, 2025 | $0 | $86,880 | $7,350 | $80,167 | $58,800 | $122,500 | $7,963 | $490 |
| 81 | Jan. 1, 2026 | $0 | $79,677 | $7,963 | $71,858 | $50,838 | $122,500 | $7,963 | $490 |
| 82 | Jan. 1, 2027 | $0 | $71,795 | $9,000 | $15,699 | $15,699 | $15,699 | $1,020 | $63 |

Example Notes: —Withdrawals occur before the fee is deducted.

- The partial surrender at age 71 exceeds the LBP. Therefore the BA is reset to the lesser of the contract value after the partial surrender or the BA prior to the partial surrender less the amount of the partial surrender. In this case, the BA prior to the partial surrender less the amount of the partial surrender is less than the contract value.
- The surrender at age 82 exceeds the LBP. Therefore the BA is reset to the lesser of the contract value after the surrender, or the BA less the amount of the partial surrender. In this case, the contract value after the surrender is less than the Benefit Amount prior to the surrender less the amount of the surrender.
- For both withdrawals exceeding the LBP, the PB is reset to the BA after the partial surrender and the LBP is reset to the PB times the WP for the attained age of the covered life.
- For both withdrawals, the rider fee is based on the new PB after the withdrawal.

Contingent Deferred Sales Charge (CDSC)—Free Up to the Amount of the LBP

If the LBP exceeds the actual withdrawal amount (AWA) on the most recent contract anniversary, any contingent deferred sales charge (CDSC) will be waived up to the LBP amount.

Guaranteed Minimum Death Benefit

A death benefit may be available on the death of an owner or annuitant. The death benefit provision guarantees that upon death a death benefit will be paid equal to the greater of the benefit amount or the contract value as of the date proof of death is received. The rider fee is not assessed on death. When proof of death is processed, the contract will go into suspense mode. No fees will apply during that period.

Contract Value (CV) Reduces Below Minimum Account Rules—Single Life Elections

If the contract value is reduced below the minimum account rules in effect on a particular valuation day, and the LBP remains greater than zero after the surrender, the following will occur;

- The annuity commencement date will be attained and subsequent premium payments will no longer be accepted.
- An annuity will be issued under the fixed lifetime and period certain payout annuity option. The frequency of payments may be elected from those offered at such time, but will not be less frequently than annually.

Fixed Lifetime and Period Certain Payout (Applicable to the Contract Value (CV) Reduces Below Minimum Account Rules—Single Life Elections)

- The lifetime portion will be based on the covered life. The covered life is the annuitant for this payout option.
- If there is a natural joint owner, then lifetime portion will be based on both contract owners. The owner and joint owner will be the annuitant and joint annuitant for this payout option. The lifetime portion will terminate on the first death of the two.
- The minimum amount paid under this annuity options will at least equal the BA.
- If the oldest annuitant is age 59 or younger (or other predetermined age), the annuity commencement date will be automatically deferred until the oldest annuitant attains age 60 (or other predetermined age) and is eligible to receive payments in a fixed dollar amount until the later of the death of any Annuitant or a minimum number of years.
- If the annuitant(s) are alive and age 60 or older (or other predetermined age), payments will be received in a fixed dollar amount until the later of the death of any Annuitant or a minimum number of years.
- The minimum number of years that payments will be made is equal to the number of LBP payments, considering the increase in the WP, required to reduce the BA to zero.
- This annualized amount will be paid over the greater of the minimum number of years, or until the death of any annuitant, in the frequency that is elected.
- The frequencies will be among those offered at that time but will be no less frequently than annually.
- If, at the death of any annuitant, payments have been made for less than the minimum number of years, the remaining scheduled period certain payments will be made to the beneficiary. A lump sum option is not available.
- These options may not be available if the contract is issued to qualify under Section 401, 403, 408, or 457 of the Internal Revenue Code of 1986, as amended. For such contracts, this option will be available only if the guaranteed payment period is less than the life expectancy of the annuitant at the time the option becomes effective. Such life expectancy will be computed under the mortality table then in use.

Contract Value Reduces Below the Minimum Account Rules—Joint Life Elections

If the contract value is reduced below the minimum account rules in effect on a particular valuation day and LBP remains greater than zero after the surrender, the following will occur.

- The annuity commencement date will be attained and subsequent premium payments will no longer be accepted.
- If owner or owner's spouse is alive, an annuity will be issued under the fixed joint and survivor lifetime and period certain payout annuity option. The frequency of the payments may be elected from those offered at such time, but will not be less frequently than annually.
- If either owner or owner's spouse is deceased, an annuity will be issued under the fixed lifetime and period certain payout annuity option. The frequency of the payments may be elected from those offered at such time, but will not be less frequently than annually.

Fixed Joint & Survivor Lifetime and Period Certain Payout (Applicable to the Contract Value Reduces Below the Minimum Account Rules—Joint Life Elections

- The covered life and covered life's spouse will be the annuitant and joint annuitant for this payout option. The lifetime benefit will terminate on the last death of the two.
- The minimum amount paid under this annuity options will at least equal the BA.
- If the younger annuitant is alive and age 59 or younger (or other predetermined age), the annuity commencement date will be automatically deferred until the younger annuitant attains age 60 (or other predetermined age) and is eligible to receive payments in a fixed dollar amount until the death of the last surviving annuitant or a minimum number of years.
- If the annuitants are alive and the younger annuitant is age 60 or older (or other predetermined age), payments will be received in a fixed dollar amount until the death of the last surviving annuitant or a minimum number of years.
- The minimum number of years that payments will be made is equal to the number of LBP payments, considering the increase in the WP, required to reduce the BA to zero.
- The annualized amount will be paid over the greater of the minimum number of years, or until the death of the last surviving annuitant, in the frequency that is elected.

The frequencies will be among those offered at that time but will be no less frequently than annually.

If, at the death of the last surviving annuitant, payments have been made for less than the minimum number of years, the remaining scheduled period certain payments will be made to the beneficiary. A lump sum option is not available.

Fixed Lifetime and Period Certain Payout
(Applicable to the Contract Value Reduces Below the Minimum Account Rules—Joint Life Elections)

The lifetime portion will be based on the covered life. The covered life is the annuitant for this payout option.

The minimum amount paid under the annuity options will at least equal the BA.

If the annuitant is age 59 or younger (or other predetermined age), the annuity commencement date will be automatically deferred until the annuitant attains age 60 (or other predetermined age) and is eligible to receive payments in a fixed dollar amount until the later of the death of the annuitant or a minimum number of years.

If the annuitant is alive and age 60 or older (or other predetermined age), payments will be received in a fixed dollar amount until the later of the death of the annuitant or a minimum number of years.

The minimum number of years that payments will be made is equal to the number of LBP payments, considering the increase in the WP, required to reduce the BA to zero.

The annualized amount will be paid over the greater of the minimum number of years, or until the death of any annuitant, in the frequency that is elected.

The frequencies will be among those offered at that time but will be no less frequently than annually.

If, at the death of the annuitant, payments have been made for less than the minimum number of years, the remaining scheduled period certain payments will be made to the beneficiary. A lump sum option is not available.

These options may not be available if the contract is issued to qualify under Section 401, 403, 408, or 457 of the Internal Revenue Code of 1986, as amended. For such contracts, this option will be available only if the guaranteed payment period is less than the life expectancy of the annuitant at the time the option becomes effective. Such life expectancy will be computed under the mortality table then in use.

Covered Life Change(s)—Single Life Elections

Any contractual change which causes a change in the covered life will result in a reset in the benefits provided under this rider.

Covered life changes in the first 12 months of the contract issue date (or other time period) will not cause a change in the BA or PB. However, the WP may change based on the attained age of the oldest covered life after the covered life change. Covered life changes after the first contract year will cause a reset in the benefits.

If the oldest covered life after the change is less than age 81 (or other predetermined age) at the time of the change, then either (i) or (ii) will automatically apply.

(i) If the rider is not currently available for sale, the existing rider will continue with respect to the death benefit only (i.e., the withdrawal feature will terminate). The rider fee will terminate.

(ii) If the rider is currently available for sale, the existing rider will continue with respect to all benefits, at the current contract rider fee. The benefit amount will be reset to the minimum of the contract value or the benefit amount on the date of the change. The PB, WP and LBP will be recalculated on the date of the change.

If the oldest covered life after the change is greater than or equal to 81 (or other predetermined age) at the time of the change, the rider continues with respect to the death benefit only (i.e., the withdrawal feature will terminate). The death benefit will be amended to contract value only. The rider fee terminates.

Covered Life Change(s)—Joint Life Elections

If owner and owner's spouse are no longer married, for reasons other than death, the following the covered life changes may occur.

If surrenders have not been taken from the contract:
Drop spouse or replace original spouse with new spouse;
The covered life will be reset and the WP scale will be based on the youngest covered life.

If surrenders have been taken from the contract:
Drop spouse;
The covered life will be reset and the WP scale will be based on the youngest covered life.

Any other contractual change which causes a change in the covered life will result in the termination of withdrawal benefits under this rider.

The rider will continue with respect to the death benefit only (i.e., the withdrawal feature will terminate). The death benefit will be amended to contract value only. The rider fee terminates.

Spousal Continuation
Single Life Election:

In the event the contract owner dies and spousal continuation is elected, the contract value will increase to the DB value (the greater of the contract value and the BA). The covered life will be re-determined on the date of the continuation. If the covered life is less than age 81 (or other predetermined age) at the time of the continuation, then either of the following will automatically apply:

If the rider is not currently available for sale, the existing rider will continue with respect to the death benefit only (i.e., the withdrawal feature will terminate). The rider fee will terminate.

If the rider is currently available for sale, the existing rider will continue with respect to all benefits at the current contract rider fee. The benefit amount and the payment base will be set equal to the contract value on the continuation date. The LBP will be recalculated on the continuation date.

If the covered life is greater than or equal to 81 (or other predetermined age) at the time of the continuation, the rider continues with respect to the death benefit only (i.e., the withdrawal feature will terminate). The death benefit will be amended to contract value only. The rider fee will terminate.

Spousal Continuation—Joint/Spousal Continuation Election

In the event that the contract owner dies and spousal continuation is elected, the spouse may do the following.

Continue the contract and not receive the death benefit.
Continue the contract and terminate the rider, the death benefit will be paid into the contract value.
Terminate the contract and rider, death benefit will be paid.

If the spouse elects to continue the contract and not receive the death benefit, A death benefit will not be paid under the terms of this rider, the contract or any other optional rider attached to and made part of the contract.

The existing rider will continue with respect to all benefits, at the current contract rider fee.

The benefit amount will be equal to the benefit amount on the continuation date.

The payment base will be equal to the payment base on the date of the continuation.

The LBP will not be recalculated on the continuation date.

The WP scale will continue to be based on the younger covered life's attained age prior to the continuation date.

The contract owner cannot name a new spouse on the contract.

The rider will terminate on the death of the surviving covered life.

If the spouse elects to continue the contract and receive the death benefit;

A death benefit will be paid according to the terms of this rider, the contract or any other optional rider attached to and made part of the contract.

The covered life will be re-determined on the date of the continuation.

If the covered life is less than age 81 (or other predetermined age) at the time of the continuation, then the existing rider will continue with respect to the death benefit only (i.e., the withdrawal feature will terminate). The rider fee will terminate.

If the covered life is greater than or equal to 81 (or other predetermined age) at the time of the continuation, the rider continues with respect to the death benefit only (i.e., the withdrawal feature will terminate). The death benefit will be amended to contract value only. The rider fee will terminate.

Effect of Death of the Owner or the Annuitant Before the Annuity Commencement Date—Single Life Election The following tables describe the effect of death of the owner or the annuitant before the annuity commencement date for the single life election.

TABLE 1

Single Life Election:

| If the Deceased is | And... | And... | Then the... |
|---|---|---|---|
| Contract Owner | There is a surviving contract owner | The annuitant is living or deceased | Joint contract owner receives the DB, rider terminates |
| Contract Owner | There is no surviving contract owner | The annuitant is living or deceased | Rider terminates, designated beneficiary receives DB |
| Contract Owner | There is no surviving contract owner or beneficiary | The annuitant is living or deceased | Rider terminates, estate receives DB |
| Annuitant | Contract owner is living | There is no contingent annuitant and the contract owner becomes the contingent annuitant | Contract continues, no DB is paid, rider continues |
| Annuitant | Contract owner is living | There is no contingent annuitant and the contract owner waives their right to become the contingent annuitant | Rider terminates, contract owner receives DB |
| Annuitant | Contract owner is living | Contingent annuitant is living | Contingent annuitant becomes annuitant and the contract and rider continues |
| Annuitant | Contract owner is non-natural person | There is no contingent annuitant | Contract owner receives DB, rider terminates |

Effect of Death of the Owner or the Annuitant Before the Annuity Commencement Date—Joint Life Election

TABLE 2

Joint/Spousal Continuation Election:

| If the Deceased is... | And... | And... | Then the... |
|---|---|---|---|
| Contract Owner | There is a surviving contract owner | The annuitant is living or deceased | Follow spousal continuation rules for joint life elections |
| Contract Owner | There is no surviving contract owner | The annuitant is living or deceased | Follow spousal continuation rules for joint life elections |
| Contract Owner | There is no surviving contract owner or beneficiary | The annuitant is living or deceased | Rider terminates, estate receives DB |
| Annuitant | Contract owner is non-natural person-non-qualified contracts | The contingent annuitant is living or deceased | Contract owner receives DB, rider terminates |
| Annuitant | Contract Owner is non-natural person-Qualified contracts | The contingent annuitant is living | Follow spousal continuation rules for joint life elections |
| Annuitant | Contract owner is non-natural person-qualified contracts | The contingent annuitant is deceased | Contract owner receives DB, rider terminates |

Effect of Death After the Annuity Commencement Date.

The following table describes the effect of death after the annuity commencement date.

TABLE 3

Effect of Death After the Annuity Commencement Date

| If the Deceased is... | And... | And... | Then the... |
|---|---|---|---|
| Annuitant | The annuitant is also the contract owner | Single life is elected | LBP cease, and remaining BA is paid in annual amounts no greater than the LBP |
| Annuitant | The annuitant is also the contract owner, and there is no surviving joint annuitant | Joint life is elected | LBP cease, and remaining BA is paid in annual amounts no greater than the LBP |
| Annuitant | The annuitant is also the contract owner, and there is a surviving joint annuitant | Joint life is elected | LBP continues |

Rider Charge

The rider charge is equal to 40 bps (or other amount) times the payment base on each contract anniversary. The contract anniversary date is the day of the anniversary. All processing occurs after the end of the trade date.

First—all other financial transactions.

Second—take the AMF.

Third—take the Rider Charge.

In case of total surrender, a pro rata share of the rider fee is equal to the rider fee percentage multiplied by the cumulative gross premium, multiplied by the number days since the last fee was assessed, divided by 365.

The rider fee is withdrawn from each investment option in the same proportion that the value of the investment option bears to the contract value.

Includes all investment options, including the fixed accumulation feature.

Does not include the DCA plus feature. Any money in the DCA plus feature is deducted from the contract value for purposes of determining the proportional value of each investment option.

If a surrender is taken on any other date other than the contract anniversary and such surrender causes the total surrenders during the year to exceed the LBP and reduces the contract value zero, a pro rata share of the rider fee will be deducted from the amount otherwise payable.

The rider charge will be discontinued once an annuity option available under the contract or rider becomes effective. The rider charge may be limited on fixed accounts based on state-specific regulations.

It will be a reserved right for the issuing company to increase the rider fee up to a maximum rate of 0.75% (or other amount) anytime on or after the fifth contract anniversary or 5 years from the date that the owner is last notified of a fee increase (or other time).

The fee will only be increased on riders eligible for future WP increases.

If the WP in effect is the maximum allowed in the WP schedule, no fee increase will apply.

If the rider is not eligible to future WP increase due to surrender activity, no fee increase will apply.

If the rider fee is increased, the contract owner may deny the fee increase. No additional WP increases will apply.

If the contract owner denies the fee increase, he/she will not be able to accept the fee increase at a later date.

Fund Allocation Restrictions

The owner is required to participate in a quarterly rebalancing program and is required to provide written instructions that comply with the following:

(1) At least 40%, but not more than 70% of the total allocations must be allocated among sub-accounts in the following investment categories: international/global equity], domestic equity, capital preservation, and fixed income.

(2) No more than 40% of the total allocations must be allocated among the following investment categories: small cap, international alternative, and money market.

(3) The remaining amounts must be allocated among the other investment categories so that the total allocations equal 100%.

(4) A periodic rebalancing date (from the 1st through the 28th day of the month) must be chosen.

(5) The first rebalancing date must be scheduled to begin within ninety-five (95) days from the GMWB effective date.

(6) The owner must agree to furnish new allocation instructions that comply with the first three items listed above prior to any future closure or elimination of a sub-account in which the owner is invested.

The owner may request to change his/her instructions while the rider is in effect provided that each request complies with items (1)-(4) listed immediately above.

On the later of the rider effective date and on each quarterly rebalancing date thereafter, the account value will be automatically reallocated to maintain the percentage allocation among the sub-accounts that have been selected. Any additional premiums must be allocated in accordance with the sub-accounts and percentages that have been selected. Transfer among sub-accounts may be requested while the rider is in effect provided that each request results in an allocation of the account value that complies with items (1)-(2) listed above as of the end of the last valuation period preceding receipt of the request. Only pro-rata withdrawal requests affecting all sub-accounts in which the owner is invested will be accepted while the rider is in effect.

The issuing company reserves the right to impose additional limitations on the owner's ability to allocate to or make transfers involving designated sub-accounts which may be made available in the future. The company may waive the above restrictions.

Aggregation

For purposes of determining the BA under the rider, one or more deferred variable annuity contracts issued to the owner with the rider attached in the same calendar year may be treated as one contract. If the contracts are aggregated, the period over which withdrawals are measured against the payment benefit will change.

The effective date of the election until the end of the calendar year will be treated as a contract year for the purposes of the LBP limit. A pro rata rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts.

If withdrawals exceed those combined limits, the aggregate BA will be set to the combined contract values of the aggregated contracts. The LBP will then equal the withdrawal percent multiplied by the new BA.

If withdrawals do not exceed those combined limits, each withdrawal will reduce the BA dollar for dollar. The withdrawal benefits relating to the contract value reaching zero will not apply until the contract value of all aggregated contracts reaches zero.

The rider fee will be taken at the end of each calendar year. It will be deducted pro rata from all of the sub-accounts and fixed accounts of the aggregated contracts.

If the contract values of all aggregated contracts reach zero, the annuity options on the life or lives of the owner(s) will be offered. The lifetime and fixed period option will pay the combined LBP for the lifetime of the owner(s) with a period certain as defined earlier in this specification.

Annuity Commencement Date

If the annuity reaches the maximum ACD, which is the later of the $10^{th}$ contract anniversary and the date the annuitant reaches age 90, the contract must be annuitized unless it is agreed upon to extend the ACD. In this circumstance, the contract may be annuitized under standard annuitization rules, or alternatively, under the rules applicable when the contract value is below the minimum account rules in effect. Note that the last option, a payout based on CV less than the minimum account rules, will result in an annuity based on the life of the owner(s), not the annuitant. The contract value need not be below our minimum account rules at the ACD for the owner(s) to select this option.

Filing Preference

The filing preference field may have two separate riders, one for Single Life and one for Joint Life. The riders will be launched individually as approved by the individual states.

Premium Restrictions

Prior company approval is required on all subsequent premium payments received after the first 12 months. The approval rules are as follows.

- 1035 applications received with money are exempt from these rules.
- Invest Ease Programs will not accept any subsequent premium payment in excess of two (2) times the original invest ease amount. In order to qualify, the program must be in effect for at least three (3) consecutive payment cycles.
- Any other subsequent premium(s) will not be accepted if it is in excess of the minimum of the cumulative first year premium or $100,000.

Additional Annuity Contract(s) Rules

Additional terms of the contract(s) or rider(s) include the following. The benefits under the contract cannot be assigned. If the free look provision under the contract is exercised, the rider will terminate.

Subject to state approval, a rider will be made available to the owners of the contracts currently available for sale, which are issued on or after the date the rider is approved for sale in the state of issue. This does not imply post-issue election. The rider can only be elected at issue for new contacts. Post-issue election will be determined on an as needed basis.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set routine (block 108), via the computer systems, as further specified in FIG. 3. Thereafter customer communication is established through the customer communication routine (block 110) as further specified in FIG. 4. The application processing routine ends at (block 112).

Figure 2:
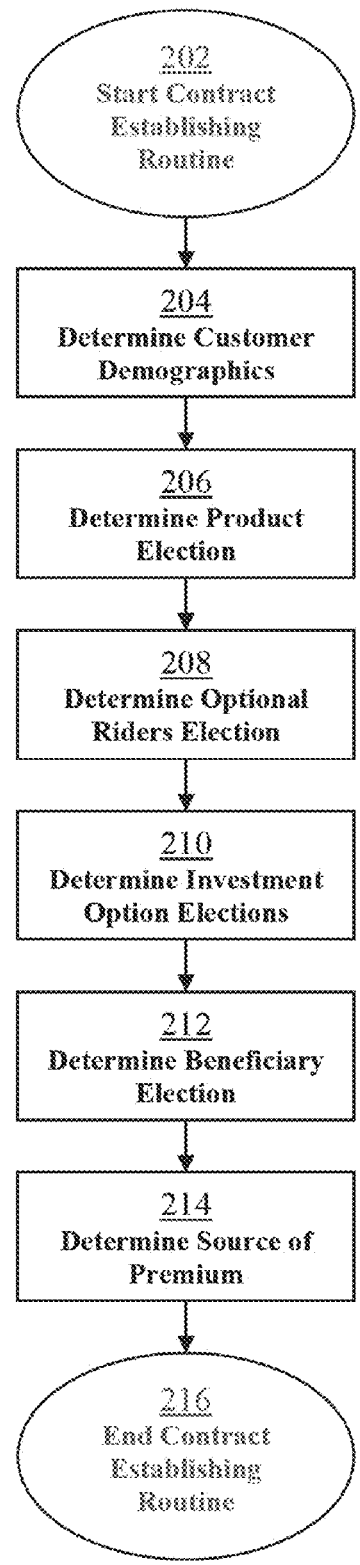
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products which each have different characteristics including the costs and fees as well as the liquidity features associated therewith. The election of optional riders is determined (block 208). For example, the optional riders may be elected from a group of different riders which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
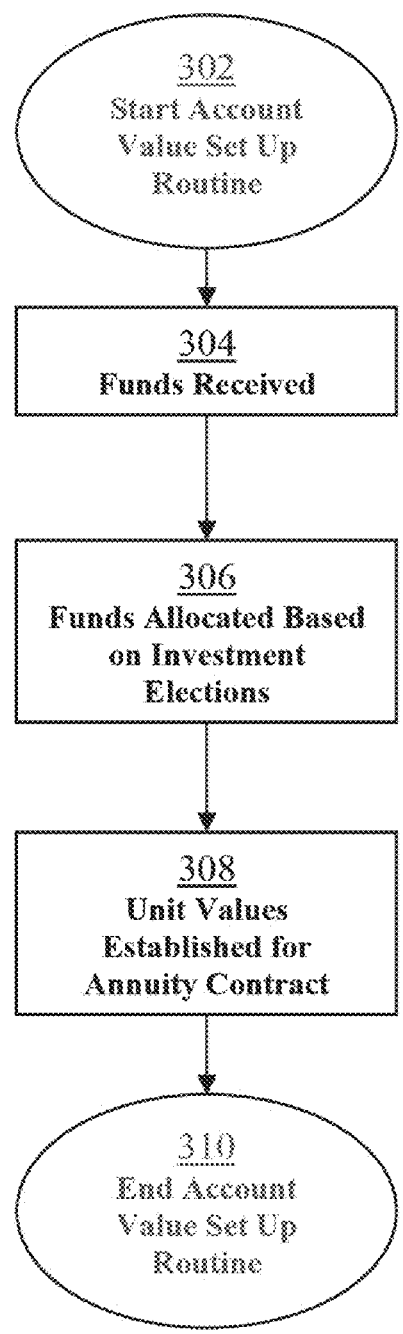
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
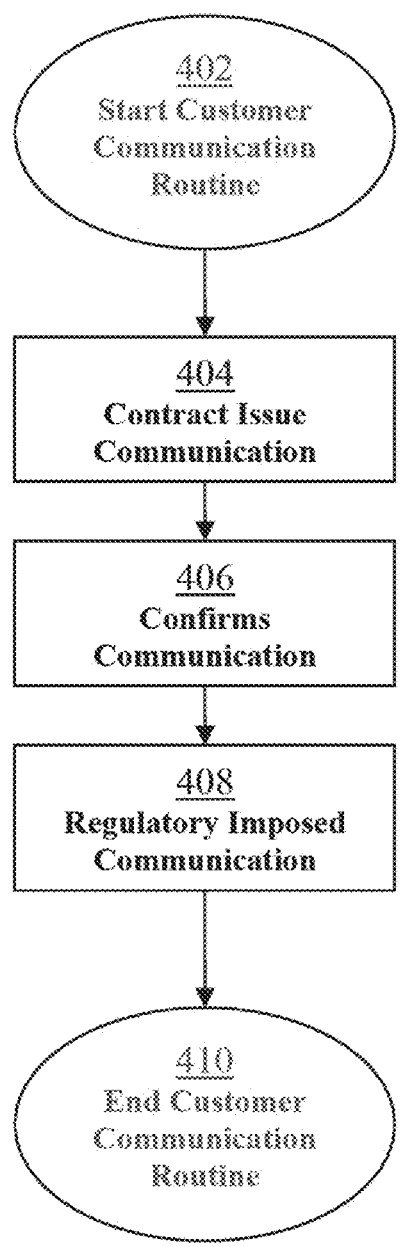
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408). It should be understood that the steps taken for establishing customer communication may proceed in various orders and that the order shown in FIG. 4 is for illustrative purposes only and is only one embodiment of said steps. The customer communication routine ends at (block 410).

Figure 5:
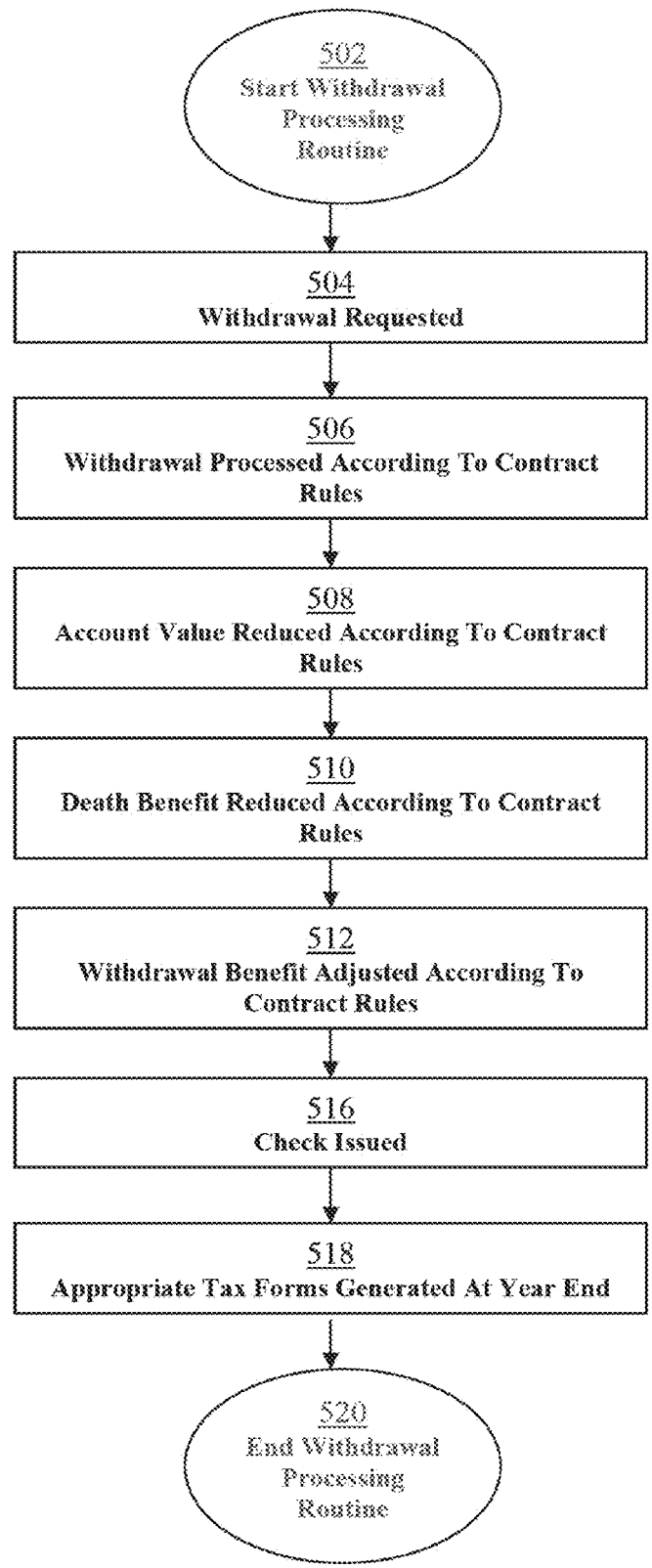
FIG. 5 is a flow chart illustrating the appropriate steps after a withdrawal is requested.

FIG. 5 is a flow chart illustrating the appropriate steps after a withdrawal is requested. The withdrawal processing routine starts at (block 502). A withdrawal is first requested by the relevant life at (block 504). The withdrawal is then processed according to the contract rules (block 506). The contract rules are embedded in a computer system or the like and vary according to the type of annuity contract. For example, in certain embodiments, a requested withdrawal amount by the relevant life may be limited by the contract rules to a specific withdrawal percent that is applied by the computer system, and wherein the contract rules specify the withdrawal percent according to the age of the relevant life or the number of years since the contract was established. Therefore, the contract rules govern the data flow in the computer system. The contract rules are administratively built into the computer system to obviate the need for manual intervention by the insurance company. The account value is reduced according to the contract rules (block 508). The death benefit is reduced according to the contract rules (block 510). The withdrawal benefit is adjusted according to the contract rules (block 512). The check or other form of payment is issued (block 516). The appropriate tax forms are generated at year end (block 518). It should be understood that the steps taken for processing withdrawals may proceed in various orders and that the order shown in FIG. 5 is for illustrative purposes only and is only one embodiment of said steps. The withdrawal processing routine ends at (block 520).

Figure 6:
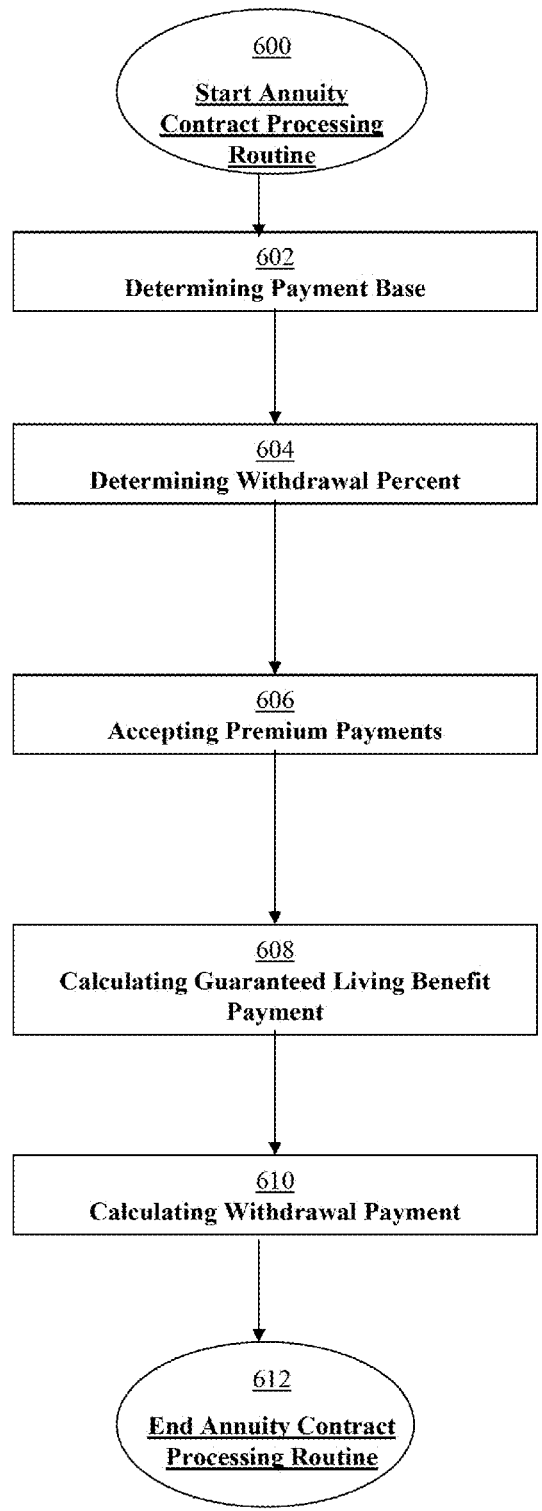
FIG. 6 is a flow chart illustrating a preferred embodiment of the present invention comprising a data processing method for administering an annuity contract for a relevant life.

FIG. 6 is a flow chart illustrating a preferred embodiment of the present invention comprising a data processing method for administering a deferred variable annuity contract. It should be understood that the order of the successive method steps is shown for the sake of illustrating but one example and that the order of method steps can proceed in any variety of order. In one embodiment of the present invention, the invention comprises a data processing method for administering a deferred variable annuity contract for a relevant life, the annuity contract having a payment base value, a contract value, and lifetime benefit payments. The present method begins at step 600. The present method determines a payment base for said annuity contract (block 602) that is a function of the previous premium payments and withdrawals by the relevant life. The present method determines a withdrawal percent for said annuity contract (block 604). If requested by the relevant life, the present method periodically accepts premium payments from the relevant life (block 606) which increase the payment base and the contract value. If requested by the relevant life and the covered life is older than a predetermined age (i.e. 60 years old), the present method periodically calculates a lifetime benefit payment for the relevant life (block 608) which decreases the contract value. If requested by the relevant life, the present method periodically calculates a withdrawal payment (block 610)—that is in excess of the lifetime benefit payment—for the relevant life which decreases each of: the contract value and the payment base. Preferably, the lifetime benefit payment is related to a withdrawal percent and the withdrawal percent automatically increases over the term of the annuity contract and therefore with the age of the relevant life.

It should be understood that several of the method steps of the present invention (for example blocks 602 and 604) require a computer to use the method of the present invention; that is to say the calculations and appropriate data records must be accomplished by a computer. For example, in one embodiment of the present invention, the payment base is related to premium payments by the relevant life. A computer receives the payments and processes the appropriate calculations. In one embodiment, the lifetime benefit payment is dependent on a pre-selected withdrawal percent. Preferably, the withdrawal percent is based on the age of the relevant life at the time of the requested lifetime benefit payment. Preferably, the withdrawal percent automatically increases over the term of the annuity contract and with the age of the relevant life, and these age-based withdrawal percents are set by the company issuing the annuity.

The annuity commencement date is established according to pre-established rules, subject to certain restrictions. The initial guaranteed death benefit amount is determined by calculations according to the present invention. Preferably, the initial guaranteed death benefit amount is established for calculation purposes. In a preferred embodiment, the initial guaranteed death benefit amount is equal to the payment base. The administration of the deferred variable annuity contract ends at (block 612).

Figure 7:
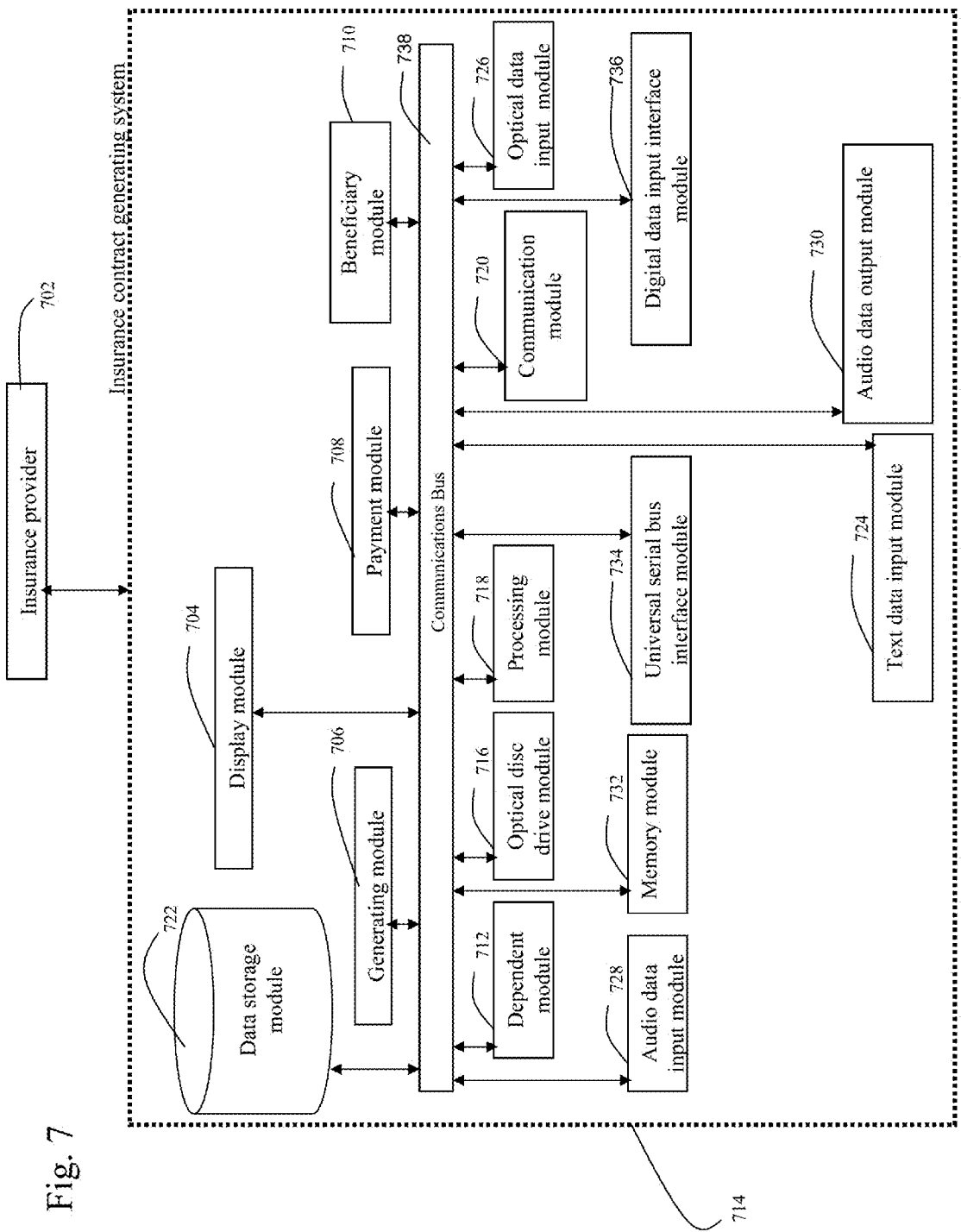
FIG. 7 is a flow chart illustrating an embodiment of the present invention comprising a data processing method for administering a deferred annuity product for a relevant life.

Referring next to FIG. 7, depicted is a preferred embodiment of a system on which the methods of the present invention may be implemented. In one example of the preferred embodiment, the insurance contract generating system 714 would generally be used by an insurance provider 702, however the system may be operated by any individual or organization offering an insurance product as outlined in the present specification without departing from the spirit of the present invention. System 714 may be implemented in many different ways such as part of a single standalone server or as a network server or servers which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor. In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/I P.

In the preferred embodiment, all of the modules described herein are operably inter-connected via a central communications bus 738. The communications bus 738 is able to receive information from each of the modules, as well as to transmit information from one module to another. The insurance contract generating system 714 further includes a display module 704, and a generating module 706. The generating module is used for generating an insurance contract, wherein the insurance contract provides coverage to an individual or group for at least one event defined in the insurance contract.

The insurance contract generating system 714 additionally includes a payment module 708 for making payments to an insured individual or group for a predetermined period of time as defined by the deferred annuity insurance contract.

The system further comprises a beneficiary module 710 for choosing a beneficiary to receive payments from the insurance provider in the instance of an insured individual's death. Furthermore, the system comprises a dependent module 712 for offering an insurance contract structured according to the methods of the present invention to dependents of an individual eligible for the insurance contract described herein.

Additionally, the insurance contract generating system 714 includes: a storage drive 716 for receiving data stored on a storage disc, a processing module 718 for processing digital data received by and contained in the insurance contract generating system 714, a communication module 720 for bi-directional communication with external and telecommunications systems, a data storage module 722 for storing and managing digital information, a text data input module 724 for inputting data in the form of text, and a data input module 726 for converting to digital format documents and images and inputting them into the insurance contract generating system 714.

Finally, the insurance contract generating system 714 includes: an audio data input module 728 for receiving and inputting audio information, an audio data output module 730 for outputting data in audio format (i.e. recorded speech, synthetically generated speech from digital text, etc), a memory module 732 for temporarily storing information as it is being processed by the processing module 718, a universal serial bus interface module 734 for receiving and transmitting data to and from devices capable of establishing a universal serial bus connection, and a digital data input interface module 736 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step up percent, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

For example, a user provides instructions for the amount of the living benefit payment that is requested. It should be understood that the user may communicate with the computing system directly or indirectly through another party, such as the insurance provider 702. In the event the user communicates with an insurance provider 702, the insurance provider 702 then receives and transfers information, to and from the insurance contract generating system 714 via the text data input module 724, audio data input module 728, audio data output module 730 and the display module 704. For example, the user provides instructions for the amount of the living benefit payment that is requested. As used herein the data storage module 722 is also referred to as a storage device. The processing module 718 is contained within the insurance contract generating system 714, which is coupled to the storage device, the storage device stores instructions that are utilized by the processor. The instructions comprise: (i) an instruction for determining a present payment base; (ii) an instruction for determining a present contract value; (iii) an instruction for determining a withdrawal percent; and (iv) an instruction for calculating a lifetime benefit payment; wherein the lifetime benefit payment is related to the withdrawal percent and wherein the withdrawal percent automatically increases over the term of the annuity contract.

Figure 8:
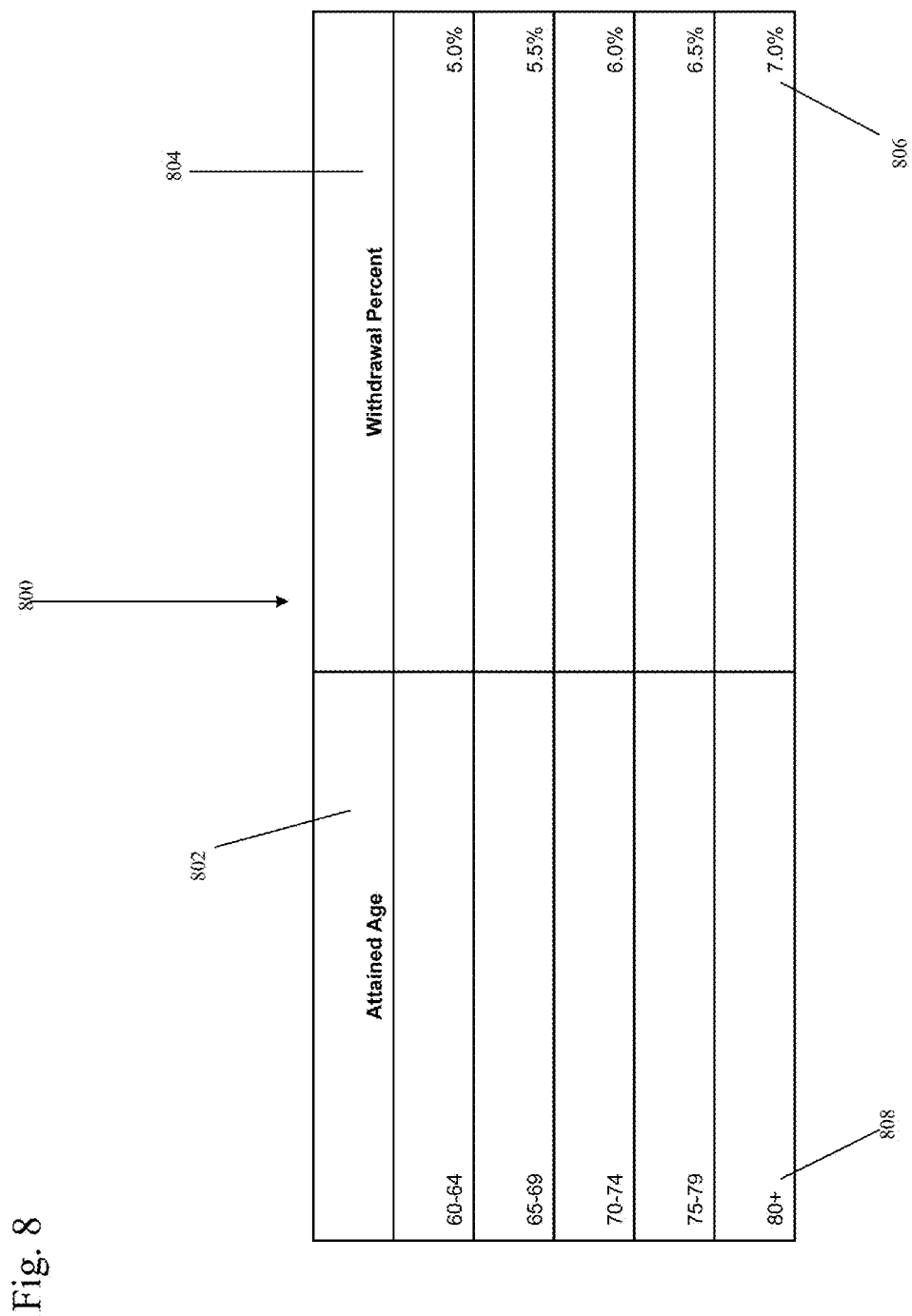
FIG. 8 depicts a table illustrating withdrawal percents as a function of age in accordance with an embodiment of the present invention.

FIG. 8 shows a table 800 illustrating exemplary withdrawal percentages 806, which are illustrated under "Withdrawal Percent" column 804 as a function of age. More specifically, table 800 illustrates a withdrawal percent chart that provides the withdrawal percent 806 that corresponds with the various attained ages 808 of the relevant life. "Attained Age" column 802 illustrates the various attained ages 808. Preferably, the lifetime benefit payments are not allowed to be made until the relevant life has reached the age of 60 as shown by table 800. In this example, the initial investment is $100,000.

Turning to FIG. 9, shown is table 900, which illustrates exemplary lifetime benefit payments 908 and 910 as a function of age for annuities associated with various withdrawal percents. The data in table 900 directly corresponds with the data from above-referenced table 800 (i.e. the withdrawal percents that correspond to each age group as shown in FIG. 8 are directly applied to the example illustrated by FIG. 9). More specifically, table 900 illustrates hypothetical lifetime benefit payments 908 and 910, which correspond to various withdrawal percents as applied to Method A and Method B of the present invention, respectively. The formula used to calculate the lifetime benefit payment amounts in this example is: Lifetime Benefit Payment=Withdrawal Percent×Payment Base. In Method A, the withdrawal percent is 5% for all attained ages. In Method B, the withdrawal percent automatically increases over the term of the annuity contract and based on the attained age of the relevant life as provided by the withdrawal percent table 800. "Lifetime Benefit Payments based on Method A" column 904 illustrates the hypothetical lifetime benefit payments 908 according to a "flat" withdrawal percent that is locked in at 5% no matter the attained age of the relevant life. "Lifetime Benefit Payments based on Method B" column 906 illustrates the hypothetical lifetime benefit payments 910 according to the withdrawal percents provided by the withdrawal percent table 800, wherein the withdrawal percent automatically increases over the term of the annuity contract. Additionally, "Age" column 902 illustrates the age of the relevant life. In this example, the age of the relevant life ranges from 60 to 85. Furthermore, it is important to note that the withdrawal percent continues to automatically increase even after the lifetime benefit payments 910 have begun to be taken by the relevant life. In this example, for the purposes of illustration, lifetime benefit payments 908 and 910 have not been taken; instead the values listed are the hypothetical amount that is available for each period.

It is important to note that the present invention preferably allows the relevant life to select the present payment base (rather than the original payment base) or the present contract value (rather than the original contract value) as the withdrawal base. In the example illustrated by FIG. 8, the payment base does not change from its original value because there are no additional premium payments and there are no withdrawals in excess of the lifetime benefit payments. Therefore, in the example, the present payment base is always equal to the original payment base. However, it should be noted that in some situations the payment base value will change over time from its original value; preferably, the relevant value of interest in the present invention is therefore the present payment base, not the original payment base. In another embodiment, the original payment base is used for the selection of the withdrawal base.

Figure 10:
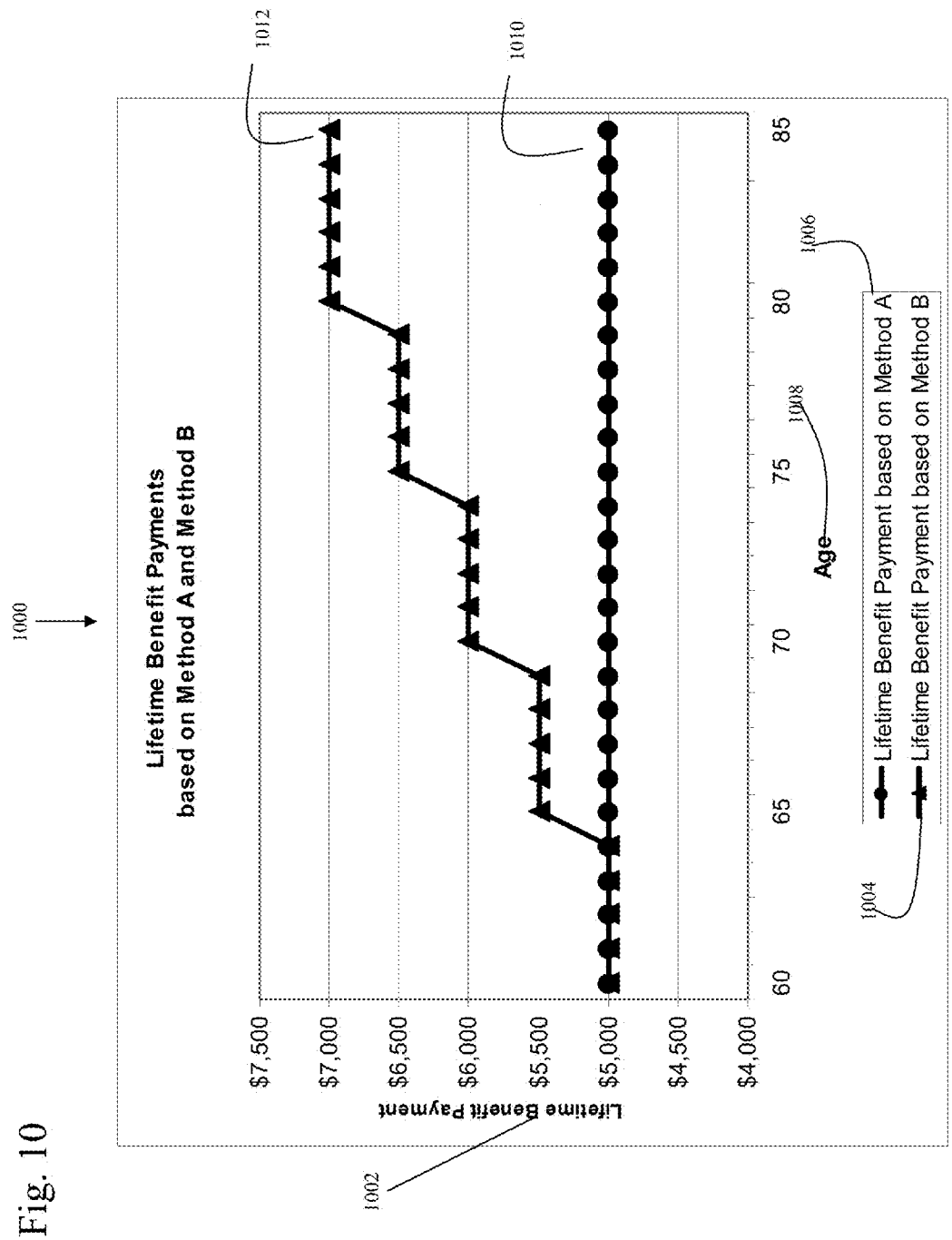
FIG. 10 depicts a graph illustrating lifetime benefit payments as a function of age for annuities associated with various methods in accordance with the preferred embodiment of the present invention and as described in FIG. 8 and FIG. 9.

FIG. 10 depicts graph 1000, which illustrates the lifetime benefit payments based on Method A and Method B as described above with respect to FIG. 9. Graph 1000 further illustrates the effects of various withdrawal percents utilized and corresponds to the data provided by table 800 of FIG. 8 and table 900 of FIG. 9. Furthermore, graph 1000 includes a "Lifetime Benefit Payment" scale 1002, which illustrates "Lifetime Benefit Payment" values 1010, and 1012 as a function of age 1008 for annuities associated with "Lifetime Benefit Payments Based on Method A" 1006 and "Lifetime Benefit Payments based on Method B" 1004, respectively. The function of age 1008 is measured in years and is illustrated on the x-coordinate of graph 1000 so as to accurately correspond to table 900 of FIG. 9. For example, graph 1000 illustrates, "Lifetime Benefit Payment based on Method B" as a line with a triangle symbol, which initially starts at a "Lifetime Benefit Payment" value 1012 of $5,000. At age 65, as displayed on graph 1000, Lifetime Benefit Payment based on Method B" 1004 shows a positive incline from age 60 and illustrates a "Lifetime Benefit Payment" value 1012 of $5,500, which accurately corresponds to the appropriate values represented in table 900 of FIG. 9. Further, as illustrated in graph 1000, "Lifetime Benefit Payment based on Method B" 1004 continues to positively incline and stabilize in accordance to the values represented in "Lifetime Benefit Payment based on Method B" column 906 as depicted in table 900 of FIG. 9.

Additionally, as illustrated by graph 1000, the hypothetical lifetime benefit payments continue to automatically rise when the withdrawal percent automatically rises (and when the payment base remains the same). Conversely, the hypothetical lifetime benefit payments are the lowest when using the original withdrawal percent that remains "flat" over the term of the annuity contract. The present invention provides the relevant life with the potential for greater lifetime benefit payments because the withdrawal percent automatically increases with the term of the annuity contract and with the age of the relevant life. It is important to note that for the purposes of illustration, the example in FIGS. 8, 9, and 10 illustrates hypothetical lifetime benefit payments that are not actually requested. That is, the payment base value is never reduced or increased in this hypothetical example. It is important to note that the relevant life can elect to request an amount for the lifetime benefit payment that is less than the available amount for each period.

The following description and examples further illustrate the preferred features of the present invention.

The lifetime benefit payment withdrawal may be determined by either of the following formulas or by the greater of the two formulas:

LBP withdrawal=(the Payment Base)×(the Withdrawal Percent);

LBP withdrawal=(the Contract Value)×(the Withdrawal Percent).

The lifetime benefit payment is paid periodically: such as yearly, quarterly, monthly, weekly, etc. The lifetime benefit payment that is requested by the relevant life for a given period may be any amount greater than zero and equal to or less than the greater of (the payment base)×(the withdrawal percent); and (the present contract value)×(the withdrawal percent). The available lifetime benefit payment is determined at each period by the aforementioned formula.

In most cases, the value of (the payment base)×(the withdrawal percent) will not be equal to (the present contract value)×(the withdrawal percent). Therefore, the higher of these two values is the highest available lifetime benefit payment available for that period. However, the relevant life does not have to elect the highest possible available lifetime benefit payment. The value that is requested, if any, for the lifetime benefit payment for that period will be subtracted from the contract value and the benefit amount, but not from the payment base. Therefore, the higher the lifetime benefit payment requested for a period, then the greater the possible impact on the value of (the present contract value)×(the withdrawal percent) for the subsequent period.

Preferably, the withdrawal percent is a function of the relevant life's age. Preferably, the withdrawal percent automatically continues to rise over the term of the annuity contract and with the relevant life's age, no matter if the relevant life has already begun to take lifetime benefit payments. In one embodiment, the lifetime benefit payment is not available until the relevant life reaches a predetermined age requirement, such as 60 years old.

In one embodiment, the withdrawal percent is:
a. 5.0% for lifetime benefit payments taken between ages 60 and 64,
b. 5.5% for lifetime benefit payments taken between ages 65 and 69,
c. 6.0% for lifetime benefit payments taken between ages 70 and 74,
d. 6.5% for lifetime benefit payments taken between ages 75 and 79, and
e. 7.0% for lifetime benefit payments taken on or after age 80.

In one embodiment, if the relevant life takes a lifetime benefit payment within the first 5 years of the contract, then the withdrawal percent will not automatically increase over the term of the annuity contract or with the age of the relevant life, and will instead remain equal to the withdrawal percent at the time of the first lifetime benefit payment.

In a further embodiment, the present method further comprises the step of collecting a rider fee or collecting an account maintenance fee. In another embodiment, the present method further comprises the step of: determining a benefit amount for the annuity product that is equal to the premium payments minus any lifetime benefit payments or withdrawals. In a further embodiment, if the relevant life requests a withdrawal payment—that is in excess of the lifetime benefit payment—then the payment base is reset to equal the present benefit amount. In a further embodiment, the present method further comprises the step of: calculating a death benefit to a beneficiary upon the death of the relevant life, wherein the death benefit is equal to the present benefit amount. In a further embodiment, the present method further comprises the step of: calculating a death benefit to a beneficiary upon the death of the relevant life, wherein the death benefit is the greater of: (a) the present benefit amount; and (b) the present contract value. In a further embodiment, the present method further comprises the step of: calculating a death benefit to a beneficiary upon the death of the relevant life, wherein the death benefit is the greater of: (a) a predetermined guaranteed death benefit amount; and (b) the present contract value. Alternatively, the death benefit is paid to the beneficiary only if the relevant life dies during the accumulation phase. Preferably, the value of the annuity payments, if any, equals the value of the last guaranteed lifetime benefit payment.

In another embodiment, the present invention comprises a deferred variable annuity contract comprising: (a) means for determining a present payment base; (b) means for determining a present contract value; (c) means for determining a withdrawal percent; (d) means for calculating a lifetime benefit payment; wherein the lifetime benefit payment is related to the withdrawal percent and wherein the withdrawal percent automatically increases over the term of the annuity contract.

In another embodiment, the present invention comprises a deferred variable annuity product comprising: (a) means for determining a payment base; (b) means for determining a contract value; (c) means for determining a withdrawal percent; (d) means for calculating a lifetime benefit payment; wherein the lifetime benefit payment is related to the withdrawal percent and wherein the withdrawal percent automatically increases over the term of the annuity contract.

In another embodiment, the present invention comprises a system for administering a deferred variable annuity product during the accumulation phase, the improvement comprising: administration means operative to calculate a lifetime benefit payment, wherein the lifetime benefit payment is related to a withdrawal percent and wherein the withdrawal percent automatically increases over the term of the annuity contract.

In another embodiment, the annuity product includes a step-up provision wherein the payment base is increased in response to positive performance of the underlying investments of the contract for a given period.

Other formulas may be utilized to determine the available lifetime benefit payment amount, wherein the withdrawal base is related to other values besides the payment base and/or the contract value.

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for processing data relating to a deferred annuity contract during the accumulation phase, the annuity contract having a payment base value, a contract value, and benefit payments available, for a term and in accordance with a guarantee, in each of a plurality of time periods during the term, without reduction of the payment base value, comprising:

a data storage device storing data relating to the deferred annuity contract, including data indicative of: the payment base value and the contract value; and a processor in communication with the data storage device, the processor being configured to:
determine a value of a withdrawal percent applicable to a date during the accumulation phase based on data stored in the data storage device;
access from the data storage device data indicative of at least one of the payment base value and the contract value;
based on the determined value of the withdrawal percent and either the payment base value or the contract value, determine an amount of the benefit payment available during a time period during the accumulation phase without reduction of the payment base value; and provide an output signal having data indicative of the determined amount of the benefit payment available during the time period without reduction of the payment base value;

wherein a value of the withdrawal percent is greater than zero and automatically increases during the accumulation phase and after a first of the benefit payments.

2. The computer system of claim 1, further comprising a payment module in communication with the processor for receiving data indicative of an amount of a benefit payment and for making the benefit payment to a relevant life.

3. The computer system of claim 1, wherein the processor is further configured to, responsive to receipt of data indicative of an amount of a benefit payment, determine an updated contract value by subtracting the amount of the benefit payment from the contract value, and provide an output signal having data indicative of the updated contract value.

4. The computer system of claim 1, wherein the data stored in the data storage device comprises data indicative of values of the withdrawal percent during the accumulation phase corresponding to ages of a relevant life, the withdrawal percent value increasing with the age of the relevant life.

5. The computer system of claim 4, wherein the data stored in the data storage device further comprises data indicative of a plurality of withdrawal percent values, each withdrawal percent value corresponding to a multi-year age range, the withdrawal percent value increasing as the age of the relevant life passes from one multi-year age range to a next multi-year age range.

6. The computer system of claim 5, wherein at least one of the multi-year age ranges is five years in duration, and the withdrawal percent increases by 0.5% as the age of the relevant life passes from at least one of the multi-year age ranges to a next one of the multi-year age ranges.

7. The computer system of claim 1, wherein the deferred annuity contract is a deferred variable annuity contract.

8. The computer system of claim 7, wherein the processor is further configured to, responsive to determining that a total amount of one or more withdrawals during one of the time periods exceeds the determined amount of the benefit payment available during the time period without reduction of the payment base value, determine a reduced payment base value, and provide an output signal having data indicative of the reduced payment base value.

9. A computer-implemented method for processing data relating to a deferred annuity contract during the accumulation phase, the deferred annuity contract having a payment base value, a contract value, and benefit payments available, for a term and in accordance with a guarantee, during each of a plurality of time periods during the term, without reduction of the payment base value, comprising:

accessing by a processor data relating to the deferred annuity contract and stored in a data storage device in communication with the processor, the stored data including the payment base value, the contract value, and data associated with determining a value of a withdrawal percent, the data indicative that the value of the withdrawal percent is greater than zero and automatically increases during the accumulation phase and after a first of the benefit payments;

determining by the processor, based on the accessed data, a value of the withdrawal percent applicable to a date during the accumulation phase;

based on the value of the withdrawal percent and either the payment base value or the contract value, determining by the processor an amount of the benefit payment available during a time period during the accumulation phase without reduction of the payment base value; and providing by the processor an output signal having data indicative of the determined amount of the benefit payment available during the time period without reduction of the payment base value.

10. The computer-implemented method of claim 9, further comprising transmitting from the processor via a communications bus to a payment module data indicative of a benefit payment amount, and paying a relevant life a benefit payment in accordance with the received data.

11. The computer-implemented method of claim 10, further comprising transmitting via the communications bus to a display module data indicative of the determined withdrawal percent and the determined amount of the benefit payment available, and displaying the received data by the display module.

12. The computer-implemented method of claim 9, wherein the data stored in the memory storage device comprises data indicative of values of the withdrawal percent during the accumulation phase corresponding to ages of a relevant life, the withdrawal percent value increasing with the age of the relevant life.

13. The computer-implemented method of claim 9, wherein the amount of the benefit payment available during a time period during the accumulation phase without reduction of the payment base value is based on the withdrawal percent and a greater of the payment base value and the contract value.

14. The computer-implemented method of claim 9, wherein at least one of the time periods is one year in duration.

15. The computer-implemented method of claim 14, the term for which the benefit payments are guaranteed to be available is a lifetime of the relevant life.

16. A non-transitory computer-readable medium having processor-executable instructions stored thereon, which instructions, when executed by a processor, cause the processor to:

access data relating to a deferred annuity contract, the deferred annuity contract having a payment base value, a contract value, and benefit payments available, for a term and in accordance with a guarantee, during each of a plurality of time periods during the term and during an accumulation phase of the deferred annuity contract, without reduction of the payment base value, the data being stored in a memory storage device in communication with the processor, the stored data including the payment base value, the contract value, and data associated with determining a value of a withdrawal percent, the data indicative that the value of the withdrawal percent is greater than zero and automatically increases during the accumulation phase and after a first of the benefit payments;

determine, based on the accessed data, a value of the withdrawal percent applicable to a date during the accumulation phase;

based on the value of the withdrawal percent and either the payment base value or the contract value, determine an amount of the benefit payment available during a time period during the accumulation phase without reduction of the payment base value; and provide an output signal having data indicative of the determined amount of the benefit payment available during the time period without reduction of the payment base value.

17. The non-transitory computer-readable medium of claim 16, wherein the instructions, when executed by a processor, further cause the processor to:
responsive to receipt of a request for a withdrawal, determine a total amount of withdrawals, including the requested withdrawal, during a current one of the time periods;
compare the determined total amount of withdrawals to the determined amount of the benefit payment available during the time period without reduction of the payment base value; and
responsive to determining via the comparison that the determined total amount of withdrawals is not greater than the determined amount of the benefit payment available during the time period without reduction of the payment base value, provide an output signal having data indicative that the payment base value will not be reduced as a result of the requested withdrawal.

18. The non-transitory computer-readable medium of claim 16, wherein the instructions, when executed by a processor, further cause the processor to:
responsive to receipt of a request for a withdrawal, determine a total amount of withdrawals, including the requested withdrawal, during a current one of the time periods;
compare the determined total amount of withdrawals to the determined amount of the benefit payment available during the time period without reduction of the payment base value; and
responsive to determining via the comparison that the determined total amount of withdrawals is greater than the determined amount of the benefit payment available during the time period without reduction of the payment base value, provide an output signal having data indicative that the payment base value will be reduced as a result of the requested withdrawal.

19. The non-transitory computer-readable medium of claim 16, wherein, in accordance with the guarantee, the benefit payments are available from a predetermined age of a covered life and for a lifetime of the covered life.

20. The non-transitory computer-readable medium of claim 16, wherein the data associated with determining a value of a withdrawal percent comprises data indicating a plurality of withdrawal percent values corresponding to ages of a relevant life.

* * * * *